United States Patent [19]
Cherukuri et al.

[11] Patent Number: 5,745,732
[45] Date of Patent: Apr. 28, 1998

[54] COMPUTER SYSTEM INCLUDING SYSTEM CONTROLLER WITH A WRITE BUFFER AND PLURAL READ BUFFERS FOR DECOUPLED BUSSES

[76] Inventors: Ravikrishna V. Cherukuri, 952 Big Bear Ct., Milpitas, Calif. 95035; Ranjit J. Rozario, 555 E. El Camino Real #611, Sunnyvale, Calif. 94087

[21] Appl. No.: 340,132

[22] Filed: Nov. 15, 1994

[51] Int. Cl.⁶ ............................................. G06F 13/00
[52] U.S. Cl. ..................... 395/495; 395/308; 395/458; 395/476; 395/477; 395/840; 395/872
[58] Field of Search ................................ 395/458, 476, 395/477, 478, 485, 495, 872, 876, 877, 840, 841, 847, 306, 308, 250, 474

[56] References Cited

U.S. PATENT DOCUMENTS

| | | | |
|---|---|---|---|
| 4,837,682 | 6/1989 | Culler | 395/294 |
| 4,933,909 | 6/1990 | Cushing et al. | 365/230.05 |
| 5,204,841 | 4/1993 | Chappell et al. | 365/230.05 |
| 5,265,211 | 11/1993 | Amini et al. | 395/856 |
| 5,265,233 | 11/1993 | Frailong et al. | 395/445 |
| 5,359,715 | 10/1994 | Heil et al. | 395/308 |
| 5,375,089 | 12/1994 | Lo | 365/189.04 |
| 5,392,412 | 2/1995 | McKenna | 395/872 |
| 5,463,753 | 10/1995 | Fey et al. | 395/473 |

OTHER PUBLICATIONS

Jim Detar, "NexGen Set to Debut Pentium Rival, Sans IBM to Introduce Pentium Rival Nx586 and Nx587", Electronic News, Mar. 14, 1994, p. 6.

Jim Handy, "The Cache Memory Handbook", Academic Press, 93, pp. 73-87, pp. 125-147.

"OPTi Desktop 82C802G System/Power Management Controller Data Book Revision 1.0", OPTI Incorporated, Sep. 1994.

82C499 DX System Controller Data Book, OPTi Incorporated, Aug. 1994.

"ISA/486—The 4021 CHIPSet, Databook, Revision 1.0", Chips and Technologies, Inc., 1992.

"SiS—EISA—VESA 486 Chipset SiS 85C411V/85C420V/85C431/85C405/85C406, Revision 2.0", Silicon Integrated Systems Corp., Dec. 1992.

NexGen, Incorporated, "Nx586™ Processor Databook", Oct. 28, 1994.

NexGen, Incorporated, NxVL™ System Controller Databook, Apr. 14, 1994.

*Primary Examiner*—Tod R. Swann
*Assistant Examiner*—Hong C. Kim
*Attorney, Agent, or Firm*—Fenwick & West LLP

[57] ABSTRACT

A computer system includes a processor having a cache memory and coupled to a system controller through a processor bus, a main memory coupled to the system controller through a dedicated memory bus, and a local bus master coupled to the system controller through a local bus. The system controller includes a write register and a read register that form a first path for coupling bus signals between the processor bus and main memory, and the system controller also includes a second read register that with the write buffer forms a second path to the main memory for coupling bus signals between the local bus and main memory. The first and second paths of the system controller decouple the processor and local buses, allowing processor-cache operations to proceed concurrently with operations between the local bus master and main memory. The first and second read buffers are fully snooped and implement replacement schemes that allow them to function as caches for the the processor and the local bus master, respectively, and a snoop tag register in the system controller stores recently snooped main memory addresses to eliminate redundant snoop cycles to the processor.

27 Claims, 12 Drawing Sheets

COMPUTER SYSTEM INCLUDING SYSTEM CONTROLLER WITH A WRITE BUFFER AND PLURAL READ BUFFERS FOR DECOUPLED BUSSES

TECHNICAL FIELD

This invention relates to the field of computer systems, and in particular to devices and techniques for facilitating communication among a central processor unit, cache memory, main memory, and various other bus masters, while maintaining cache coherency with substantially decreased bus traffic.

BACKGROUND AND SUMMARY

A major goal in the design of computer systems is the development of architectures that optimize the flow of data and instructions between the forms of memory devices, coprocessors, input/output (I/O) devices and the central processor unit(s) (CPU). Buses provide the communication links among these devices, and the number of buses and their interconnections are a key factor in determining the performance of a computer system. Generally speaking, the interconnections between buses and the positioning of devices on buses should allow concurrent operations, where for example data transfers between the CPU and its cache memory proceed simultaneously with data transfers between main memory and I/O devices.

The use of cache memory, however, imposes additional bookkeeping requirements on a computer system in order to maintain coherence between the data stored in cache and main memories. This bookkeeping is reflected in increased bus traffic, as main memory addresses are broadcast to cache memories on other buses. Consequently, system architectures must balance the faster memory access provided by multiple memory devices against the additional bus operations necessary to maintain the coherence of data in these memory devices. Bus operations for maintaining data coherence have priority, forcing other bus operations to be held off and thus reducing the degree of concurrent bus operation.

FIG. 1A illustrates a conventional computer system 130 including memory 112 with cache controller 113, main memory 114. In this architecture, CPU 110 is connected to CPU bus 120 in parallel with cache memory 112, and CPU bus 120 is extended so that main memory 114 and I/O devices 116 are also coupled to CPU bus 120. A local bus 126 supporting additional devices 128 such as additional I/O devices is also shown in FIG. 1A. Local bus 126 is coupled to CPU bus 120 through bus interface 117. The look-aside architecture of FIG. 1A does not allow transfers between CPU 110 and cache memory 112 to proceed concurrently with transfers between main memory 114 and I/O devices 116, since both transfers require access to CPU bus 120. In addition, cache memory 112 must be capable of monitoring (snooping) all activity on CPU bus 120 for write and read requests to main memory 114 by I/O devices 116 and additional devices 128. Otherwise data written to main memory 114 by I/O devices 116 and additional devices 128 may invalidate data in cache memory 112. Alternatively, I/O devices 116 and additional devices 128 may request data from main memory 114 that has not been updated from cache memory 112.

FIG. 1B illustrates a conventional computer system 140 including a CPU 110, a cache memory 112 with cache controller 113, a main memory unit 114, and devices 116 arrayed in a look-through or serial cache read architecture. In this architecture, CPU 110 is coupled to cache memory 112 by CPU bus 120, and cache memory 112, main memory 114, and devices 116 are coupled by means of a separate, local bus 118. Look-through architecture allows transfers between CPU 110 and cache memory 112 to proceed concurrently with transfers between devices 116 and main memory 114, since a separate CPU bus 120 and local bus 118 is available for each transfer. However, in this architecture data transfers between CPU 110 and main memory 114 must traverse both CPU bus 120 and local bus 118, and, as in look-aside architecture, such transfers are limited by traffic on local bus 118.

The look-through architecture of FIG. 1B has other limitations as well. For example, CPU 110 initiates a bus cycle to main memory 114 only after cache memory 112 has been searched, so that whenever the data sought by CPU 110 is not in cache memory 112 (cache miss),there is a delay in retrieving the data from main memory 114. In addition, cache memory 112 must be dual ported to interface with both local bus 118 and CPU bus 120, adding additional cost and complexity to the system.

In the architecture of FIGS. 1A and 1B, cache memory 112 automatically snoops all activity on CPU bus 120 and snoops all activity on local bus 118, respectively, regardless of how recently the asserted address has been snooped. Since bus snooping requires the attention of cache controller 113, snooping can interfere with data transfers between CPU 110 and cache memory 112 and further degrade operation of computer systems 130, and 140.

An embodiment of the present invention is illustrated by computer system 200 of FIG. 2. As shown, computer system 200 includes at least one CPU 210, a system controller 260, a cache memory 212, a CPU bus 220, a main memory 214, a local bus 218, and at least one I/O device 216. An optional bus 219 coupled to local bus 218 through a transceiver 270 is also shown in FIG. 2. Bus 219 may be used, for example to couple a peripheral device 240 to computer system 200. System controller 260 enhances concurrent operations by decoupling the CPU bus 220 and local bus 218, and providing a substantially independent path to main memory 214 for each of buses 218, 219, 220.

System controller 260 may also eliminate redundant snoop cycles to CPU bus 220. For this purpose, snoop-tag registers 362 (FIG. 3) is included in system controller 260 for storing address tags 342 and status tags 344 of recently snooped addresses in main memory 214. Snoop-tag registers 362 allow system controller 260 to access the necessary information on recently snooped addresses without asserting snoop cycles on CPU bus 220. The consequent reduction in traffic on CPU bus 220 enhances the performance of the computer system 200.

These and other features and advantages of the invention will become apparent to those skilled in the art from the following detailed description in conjunction with the accompanying drawings.

DETAILED DESCRIPTION

Figure 1A:
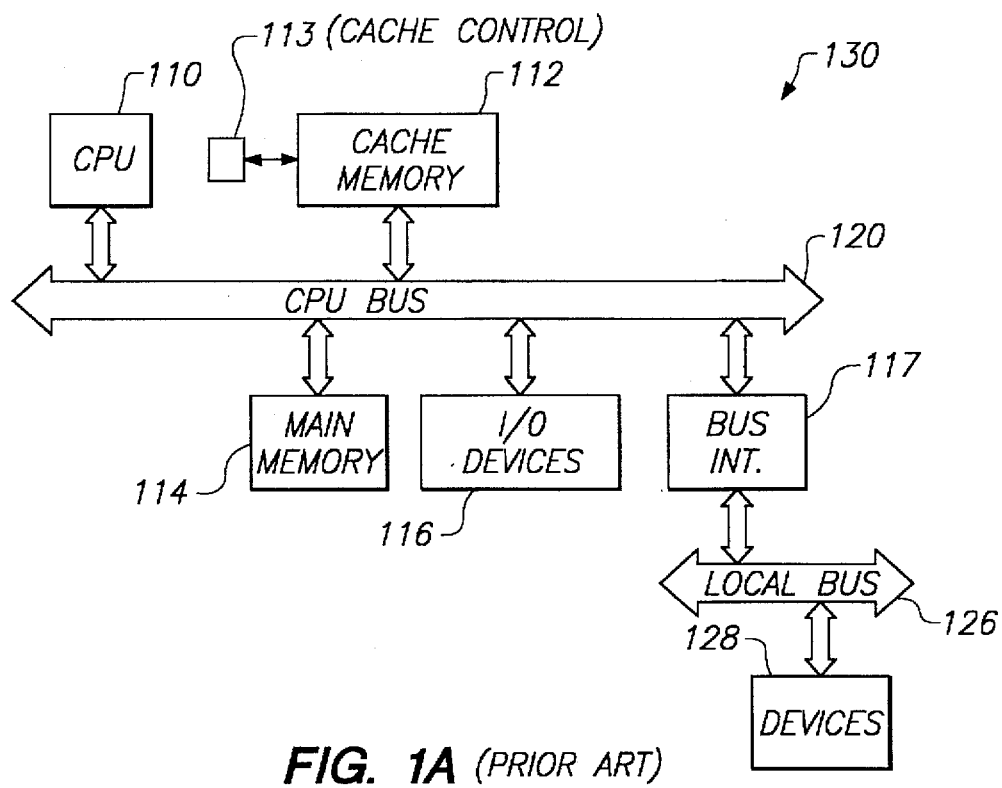
FIGS. 1A, 1B are block diagrams of conventional computer systems that implement parallel and serial cache read architectures, respectively.
Figure 1B:
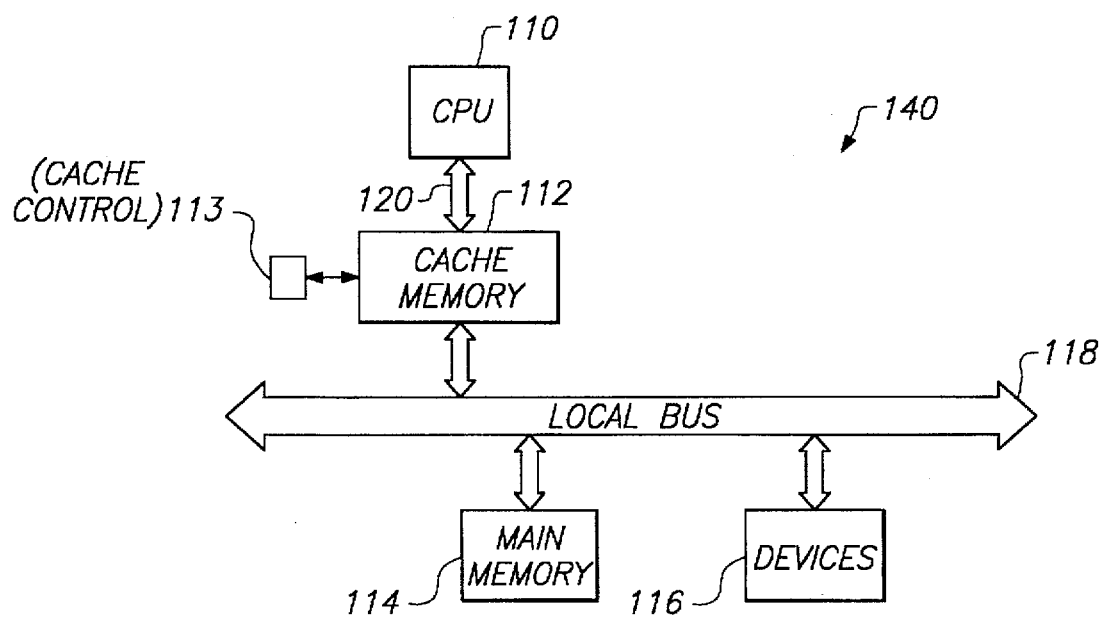
Figure 2:
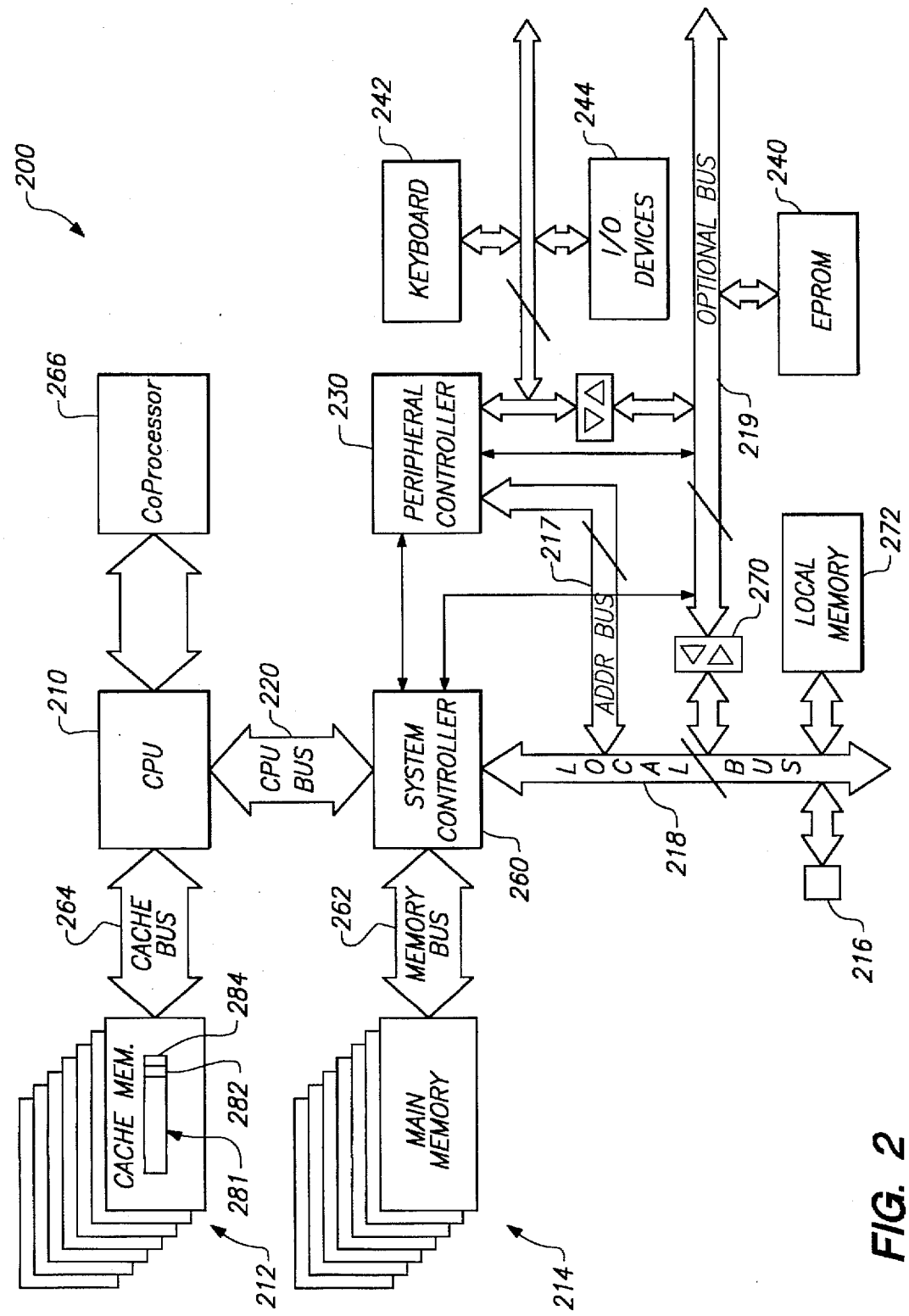
FIG. 2 is a block diagram of a computer system in accordance with the present invention.

Referring to FIG. 2, there is shown an embodiment of a computer system 200 of the present invention including a CPU 210 that is coupled to a system controller 260 through a CPU bus 220, a main memory 214 that is coupled to system controller 260 through a dedicated memory bus 262, and a local bus 218 for coupling an I/O device 216 to system controller 260. I/O device 216 may be, for example, a graphics card, a network card, or a disk controller. CPU 210 is coupled to a cache memory 212 through a dedicated cache bus 264 and to an optional coprocessor through a dedicated bus 266. Coprocessor 266 may be included to handle specialized functions such as floating point mathematics or graphics functions.

System controller 260 also supports an expansion bus 219 which is coupled to local bus 218 through a transceiver 270. Expansion bus 219 provides a path between a peripheral or I/O device 240 and local bus 218 for transfers between device 240 and device 216 and for transfers between device 240 and CPU 210 or main memory 214 through system controller 260. Expansion bus 219 may also operate in conjunction with a peripheral controller 230 to provide a path for direct memory transfers (DMA) between device 240 and main memory 214 or between device 240 and a local memory 272 on local bus 218. For this purpose, address bus 217 of local bus 218 is connected to peripheral controller. Control lines and 234 couple control signals between system controller 260 and expansion bus 219 and between system controller 260 and peripheral controller 230, respectively. Expansion bus 219 also operates in conjunction with peripheral controller 230 to couple peripheral or I/O devices 242, 244 to system controller 260.

In one embodiment, I/O device 242 is a keyboard controller and device 240 is an EPROM.

In a preferred embodiment of computer systems 200 system controller 260 is a NxVL™ system controller of NexGen, Inc., and CPU 210 and CPU bus 220 are a processor and bus, respectively, suitable for implementing industry standard x86 architecture, such as the Nx586™ processor chip and 64-bit Nexbus of NexGen, Inc. In this embodiment, local bus 218 may be a 32-bit bus such as the VL-Bus™ and expansion bus 219 may be a 16-bit bus such as the ISA bus. Accordingly, U.S. Pat. Nos. 5,093,778, 5,226,126, 5,226,130, and 5,230 which relate to the Nx586 microprocessor, the Nx586 Microprocessor and Nx587 Numerics Processor Databook, the NxVL System Controller Databook, and references cited therein are hereby incorporated by reference.

The configuration of computer system 200 indicated in FIG. 2 allows system controller 260 to function as a controller for main memory 214, an arbiter for CPU bus 220, and an interface between CPU bus 220 and local and expansion buses 218, 219. Further, system controller 260 can arbitrate access by bus masters on any of buses 220, 218, 219 to bus slaves on any other buses 220, 218, 219 and mediate operation of peripheral controller 230.

Figure 3:
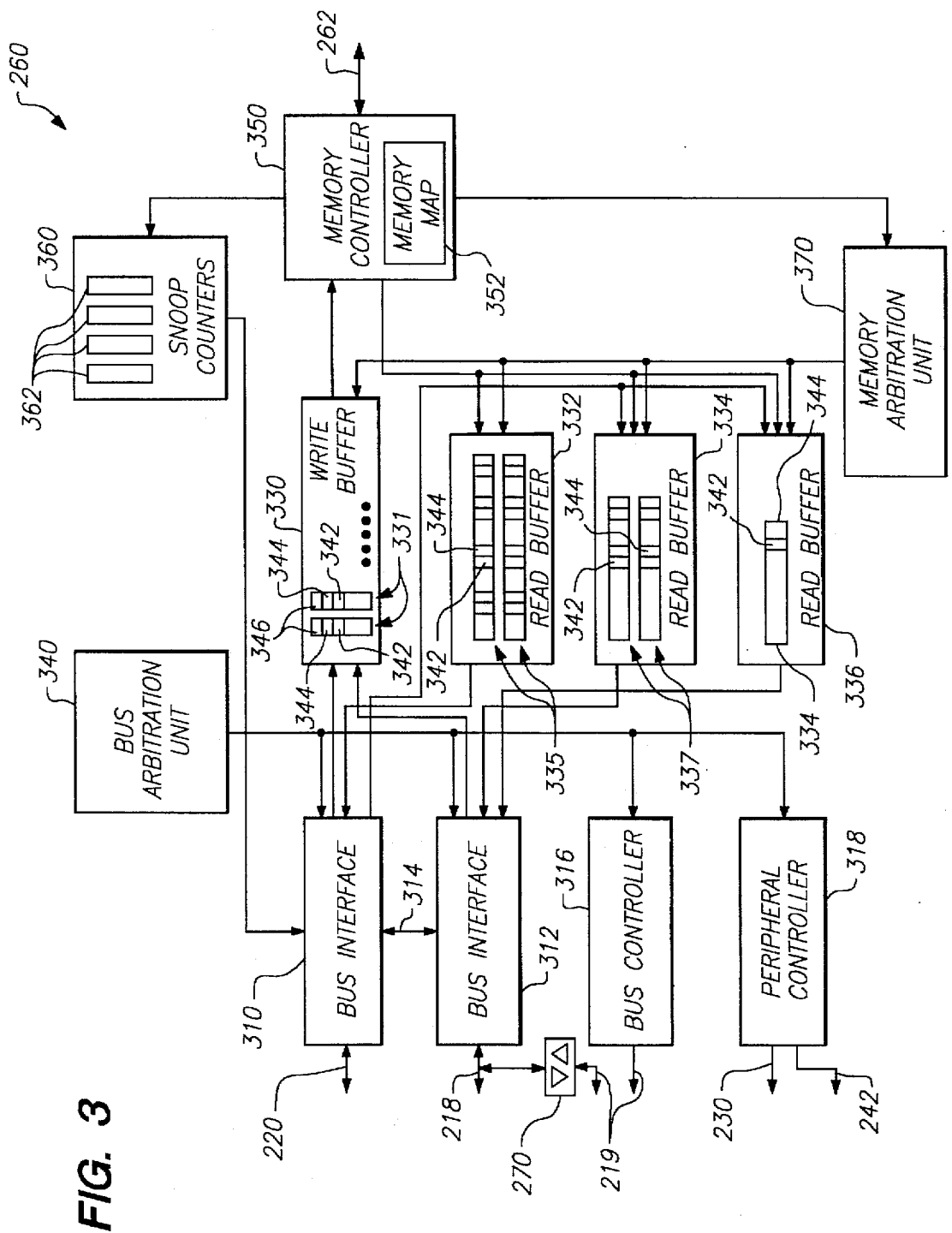
FIG. 3 is a block diagram of the system controller of FIG. 2.

Referring now to FIG. 3, there is shown a block diagram of system controller 260. CPU bus 220 and local bus 218 are coupled to system controller 260 through first and second bus interfaces 310, 312, respectively. Dedicated memory bus 262 for main memory 214 is coupled to system controller 260 through a memory controller 350. Expansion bus 219 and peripheral controller 230 are coupled to system controller 260 through a bus controller 316 and a peripheral interface 318, respectively.

Bus interface 310 is coupled to memory controller 350 through a write buffer 330 and a read buffer 332 to couple bus signals between CPU bus 220 and memory controller 350. Bus interface 312 is coupled to memory controller 350 through write buffer 330 and read buffer 334 for coupling bus signals between local bus 218 and memory controller 350. Bus interface 312 is also coupled to memory controller 350 through read buffer 336 for coupling bus signals between expansion bus 219 and memory controller 350. An interbus interface 314 provides a direct path between bus interfaces 310 and 312 for bus crossing operations between CPU bus 220 and local and expansion buses 218, 219.

Memory controller 350 provides signals to memory bus 262 responsive read and write requests operations initiated by bus masters on buses 220, 218, 219. For this purpose, memory controller 350 includes a memory map 352 for mapping the addresses of main memory 214 assigned to system controller 260 to DRAM chip rows, storage uses, and functions.

A memory arbitration unit 370 operates in conjunction with memory controller 350 and a snoop controller 360 to regulate access to main memory 214 by write buffer 330 and read buffers 332, 334, 336. Snoop controller 360 also governs the snooping operations necessary to maintain data coherence among the data signals in main memory 214, cache memory 212, write buffer 330, and read buffers 332, 334, 336. A bus arbitration unit 340 is coupled to bus interfaces 310, 312, bus controller 316, and peripheral interface 318 regulate control of buses 218, 219, 220. The operations of bus arbitration unit 340, memory arbitration unit 370, memory controller 350, and snoop controller 360 are discussed in further detail below.

The functions of system controller 260 fall roughly into three categories: coupling bus signals among bus masters on buses 218, 219, 220; operating in conjunction with main memory 214 to emulate a multi-ported memory; and maintaining the coherence of data in cache memory 212, main memory 214, write buffer 330, and read buffers 332, 334, 336.

Bus interfaces 310 and 312, bus controller 316, memory controller 350, and peripherals controller 318 support bus signals appropriate for CPU bus 220, local bus 218, expansion bus 219, memory bus 262, and peripheral controller 230, respectively. This allows system controller 260 to effectively and efficiently couple communication signals among bus masters on CPU bus 220, local and expansion buses 218, 219 and between these bus masters and main memory 214, local memory 272, and peripheral devices 242, 244.

Figure 4A:
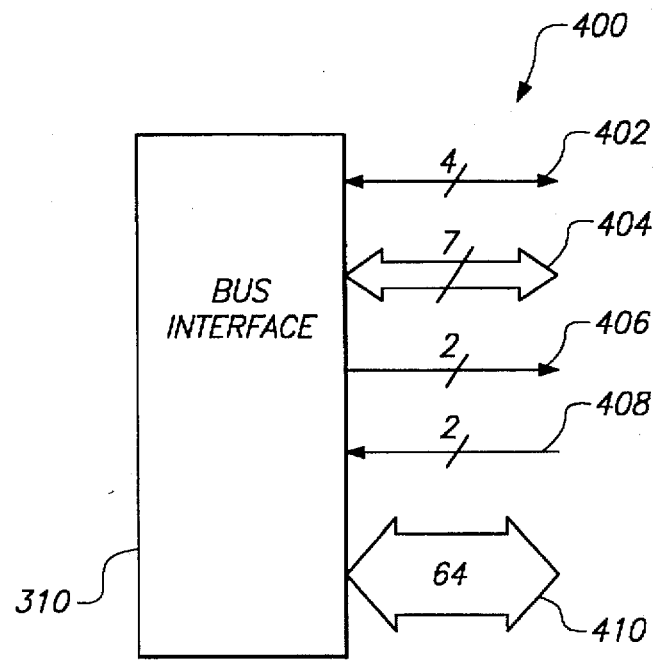
FIGS. 4A–4F are diagrams of sets of signals that couple the system controller to the other components of the computer system of FIG. 2.

Referring now to FIG. 4A, there are shown bus signals 400 supported by bus interface 310 in the preferred embodiment of system controller 260. Bus signals 400 include arbitration signals 402, cycle control signals 404, cache control signals 406, transceiver control signals 408, and address/data signals 410 for CPU bus 220. Bus signals 400 are listed in Table 1 of the Appendix along with a brief description of their functions.

Figure 4B:
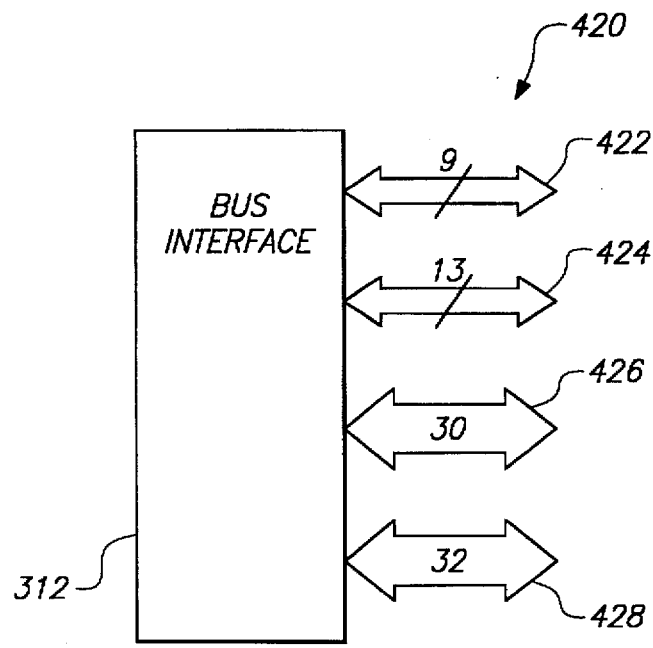

Referring now to FIG. 4B, there are shown bus signals 420 supported by bus interface 312 in the preferred embodiment of system controller 260. Bus signals 420 include arbitration signals 422, cycle control signals 424, address signals 426, and data signals 428 for local bus 218. In addition, a subset of address signals 426 and data signals 428 are used for communication with expansion bus 219. Bus signals 420 are listed in Table 2 of the Appendix along with brief descriptions of their functions.

Figure 4C:
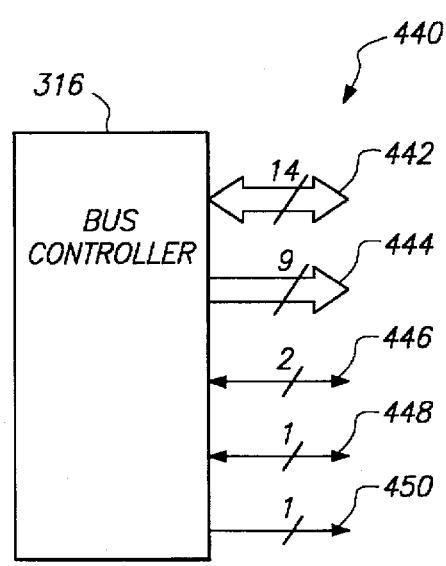

Referring now to FIG. 4C, there are shown bus signals 440 supported by bus controller 316 in the preferred embodiment of system controller 260. Bus signals 440 include cycle control signals 442, transceiver control signals 444, address signals 446, refresh signal 448, and clock signal 450 for controlling expansion bus 219. Bus signals 440 are listed in Table 3 of the Appendix along with brief descriptions of their functions.

Figure 4D:
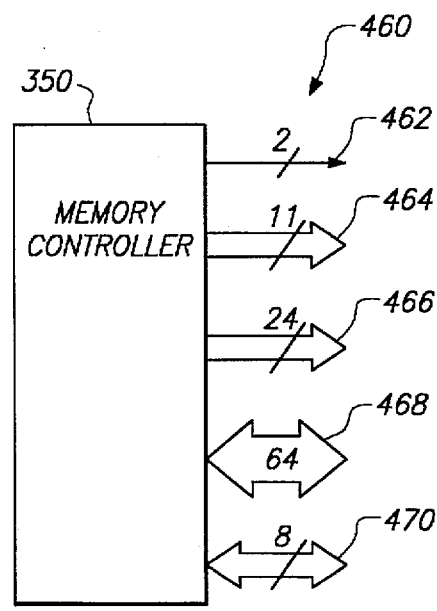

Referring now to FIG. 4D, there are shown bus signals 460 supported by memory controller 350 in the preferred embodiment of system controller 260. Bus signals 460 include cycle control signals 462, address signals 464, row/column strobe signals 466, data signals 468, and parity signals 470 for memory bus 262. Bus signals 460 are listed in Table 4 of the Appendix along with brief descriptions of their functions.

Figure 4E:
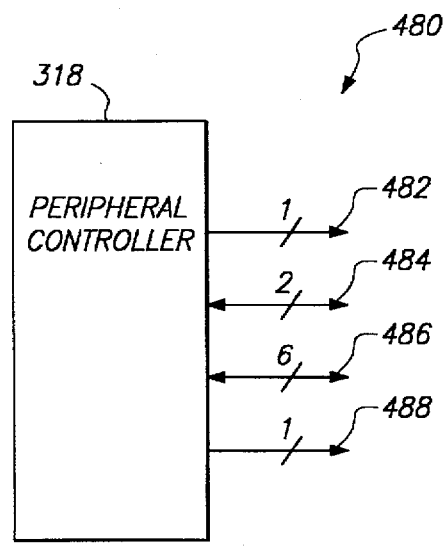

Referring now to FIG. 4E, there are shown control signals 480 supported by peripheral interface 318 in the preferred embodiment of system controller 260. Control signals 480 include cycle control signal 482, counter control signals 484, DMA control signals 486 and interrupt acknowledge signals 488 for peripheral controller 230. Control signals 480 are listed in Table 5 of the Appendix along with brief descriptions of their functions.

In addition to coupling bus signals 400, 420 between main memory 214 and bus masters on CPU bus 220 and local bus 218, respectively, system controller 260 also supports bus crossing operations. In bus crossing operations, system controller 260 acts as a bus interface for CPU 210, coupling bus signals 400, 420 between CPU bus 220 and local bus 218 using interbus-interface 314. Interbus interface 314 couples address/data signals 410 to address signals 426 and data signals 428 on local bus 218. In the preferred embodiment, multiplexing between 64-bit signals of processor bus 220 and 32-bit signals of local bus 218 is handled by bus interface 310 using standard techniques.

Figure 5A:
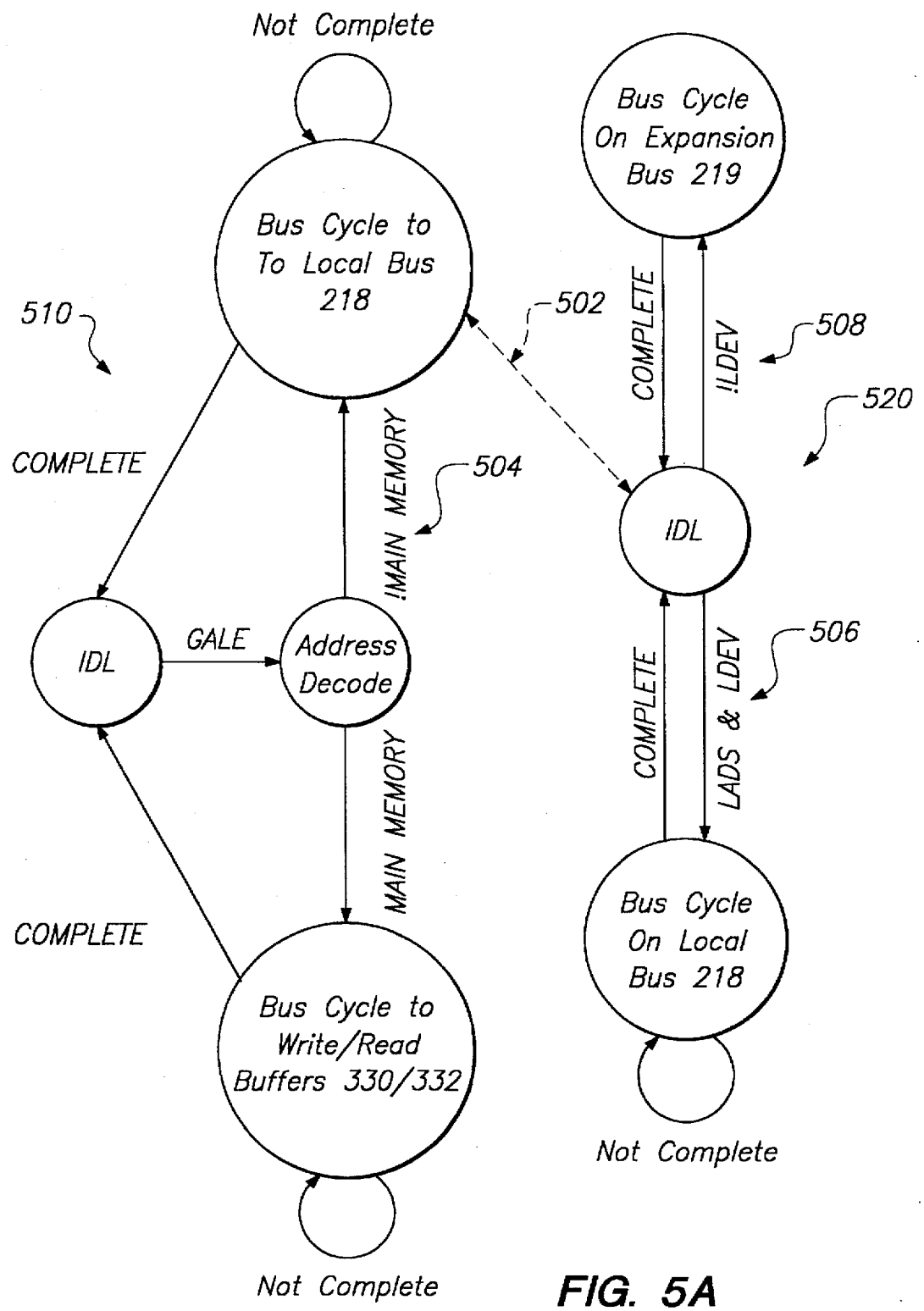
FIGS. 5A, 5B are diagrams of state machines for implementing bus crossing operations in the computer system of FIG. 2.
Figure 5B:
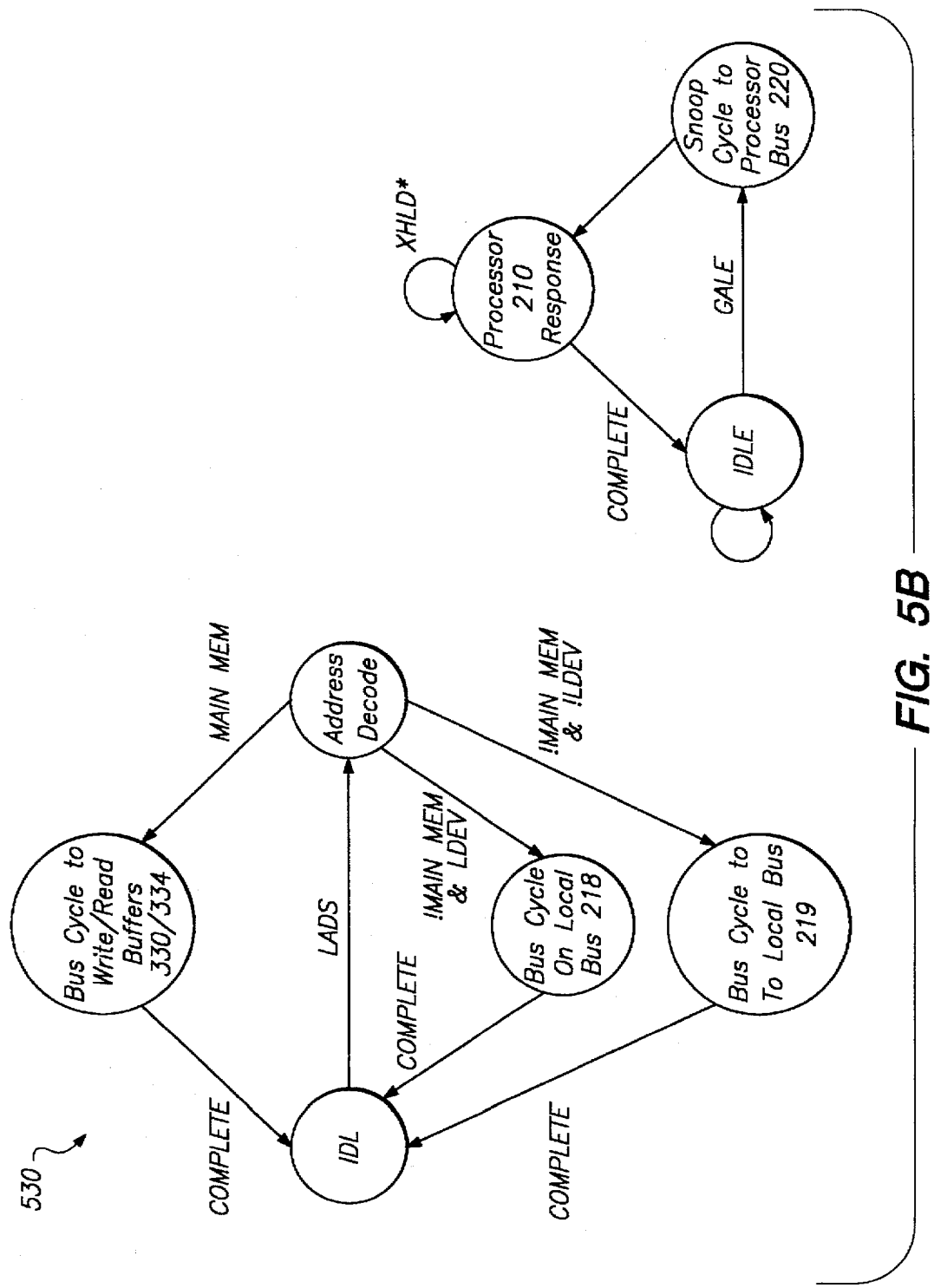

Referring now to FIG. 5A, there are shown state machines 510, 520 implemented by bus interfaces 310, 312 for handling bus crossing transfers initiated by CPU 210 via interebus interface 214. Referring now to FIG. 5B, there are shown state machines 530, 540 implemented by bus interface 312 and snoop controller 362 through bus interface 310 for handling bus crossing transfers initiated by a bus master on local bus 218. Interbus interface 314 also includes signal lines 502 for coupling state machines 510, 520. State machines 510, 520, 530, 540 are discussed below in conjunction bus crossing operations.

System controller 260 also supports bus-crossing operations between local and expansion buses 218, 219, respectively, using bus controller 316 to control transceivers 270 and expansion bus 219. Where bus-crossing operations on expansion bus 219 involve devices 242, 244, system controller 260 handles these operations using bus controller 216 operating in conjunction with peripheral interface 218 and peripheral controller 230.

Bus operations are initiated when CPU 210, device 216 assert arbitration signals 402 (NREQ*, AREQ*) and 422 (LREQ<2:0>), respectively, to gain control of buses 218, 219, 220, for bus operations. A bus master on expansion bus 219 such as device 240 initiates a DMA cycle by asserting a signal (DRQ) directly to peripheral controller 230 which in turn asserts control signal 480 (HHOLD) to gain control of buses 220, 218, 219. Device 240 may also assert refresh signal 448 (REFRESH*) to gain control of buses 220, 218, 219 to refresh memory on expansion bus 219. System controller 260 grants control of buses 218, 219, 220 to one of the requesting devices, i.e. the bus master, according to a priority scheme implemented by bus arbitration unit 340. For this purpose, bus arbitration unit 340 is coupled to bus interfaces 310 and 312, bus controller 316, and peripheral interface 318, to regulate which bus request signal is acknowledged in accordance with the priority scheme.

Figure 6:
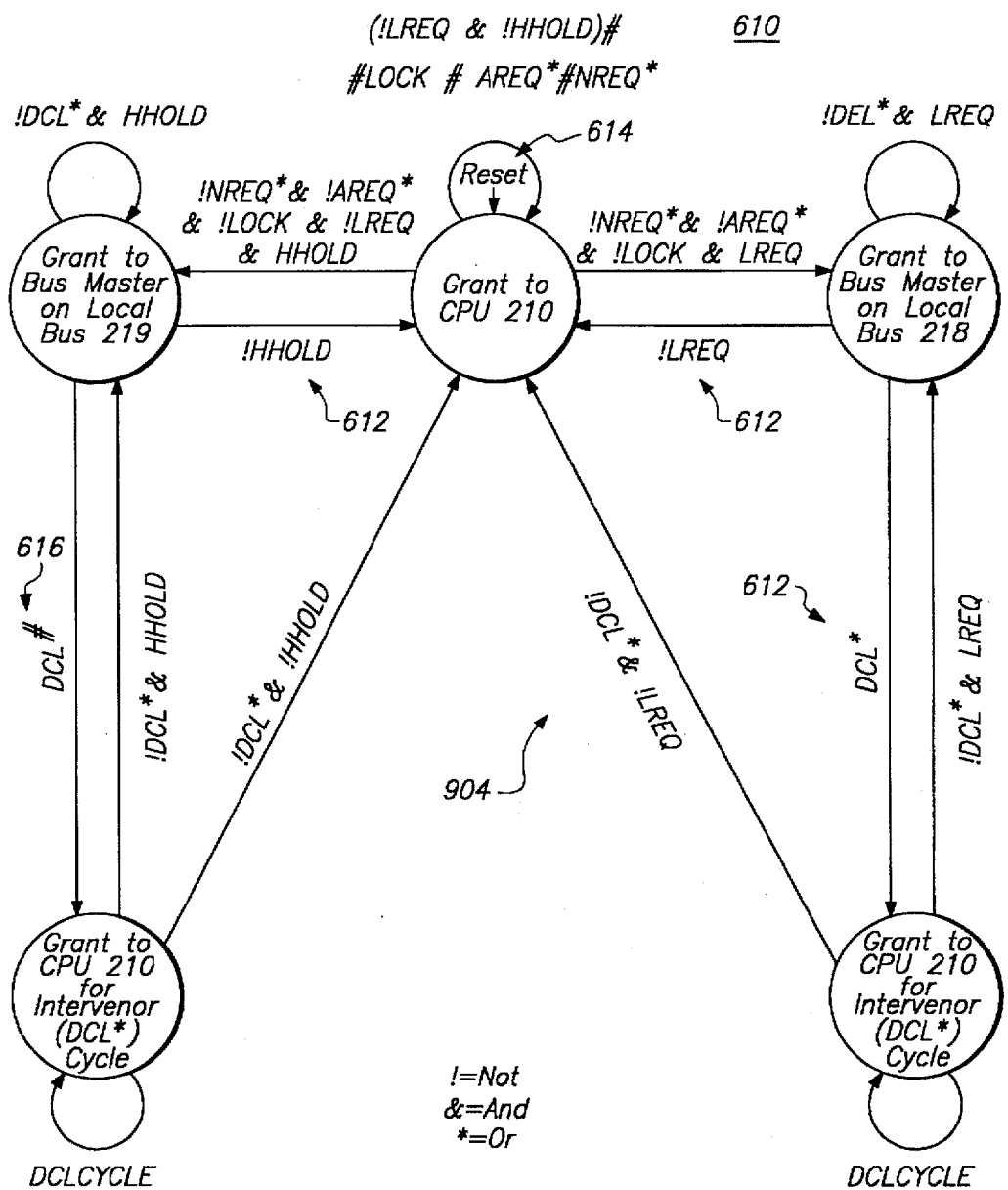
FIG. 6 is a diagram of a state machine implemented by the bus arbitration controller of a system controller in accordance with the present invention.

Referring now to FIG. 6, there is shown a state machine 610 for implementing this priority scheme in the preferred embodiment of computer system 200, according to arbitration control signals 402, 422 and control signals 482. State machine 610 grants control of buses 218, 219, 220 to CPU 210 when no other device requests access (612), when computer system 200 is reset (614), or when the contents of cache memory 212 must be written back to main memory 214 to maintain coherence of the stored data (616). Alternative bus arbitration schemes which are well known in the art may also be used.

In general, when an address is asserted by a bus master on any of buses 220, 218, 219, system controller 260 compares the address with memory map 252 in memory controller 250. If the address is outside main memory 214 (FIG. 5A, step 504), system controller 260 converts the bus cycle to a bus cycle on local bus 218 (FIG. 5A, 502) using interface 512 (FIG. 5A, step 506) interbus interface 314, bus controller 316 and peripheral interface 318 as appropriate. If no response is received from a device on local bus 218 within a preselected time, the bus cycle is converted to a bus cycle on expansion bus 219 (step 508 of FIG. 5A). If the address is asserted by a bus master on local bus 218, the bus cycle is forwarded to expansion bus 219 if no response is received by a device on local bus 218 within a preselected time.

Operation of system controller 260 is illustrated by a write operation from CPU 210 to a bus slave on expansion bus 219, device 240. CPU 210 begins by asserting arbitration signal 402 (NREQ*) on CPU bus 220. System controller 260 responds with arbitration signal 402 (GNT*) on CPU bus 220 when control of buses 220, 218, 219 is granted to CPU 210 by bus arbitration unit 340, at which point CPU 210 initiates a write bus cycle on CPU bus 220.

Figure 7:
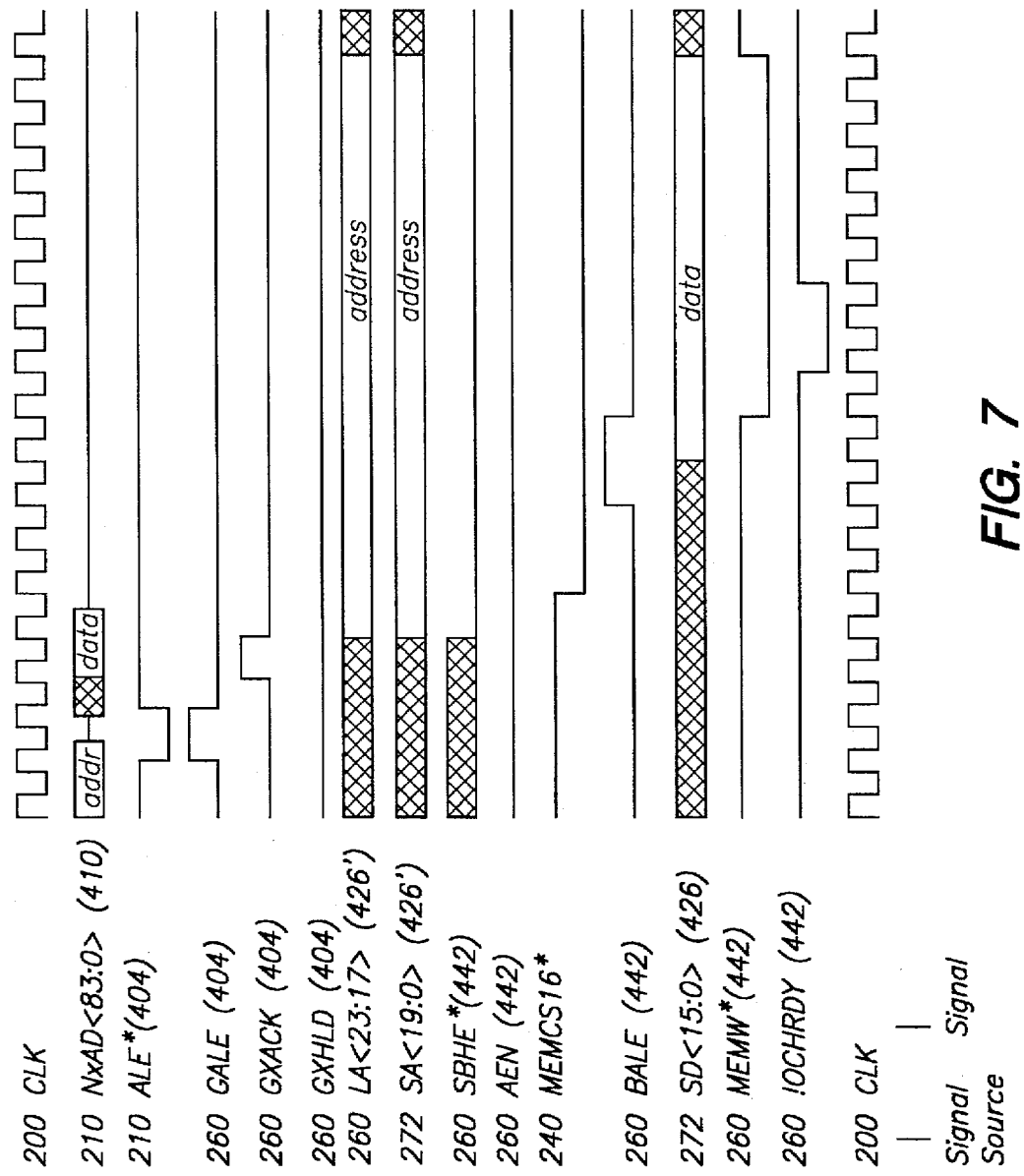
FIG. 7 is a timing diagram for a write operation from the CPU to a bus master on the expansion bus.

Referring now to FIG. 7, there is shown a timing diagram for a 16-bit write to a (16-bit) device 240 on expansion bus 219 by CPU 210. CPU 210 asserts the address of device 240 using address/data signals 410 (NxAD<63:0>) and cycle control signal 404 (ALE*) of CPU bus 220. Since the address is outside the address space of main memory 214, system controller 260 triggers interbus interface 314 to convert the bus signals on CPU bus 220 to a bus cycle on local bus 218. When no device on local bus 218 responds by asserting arbitration signal 422 (LDEV<n>*) within a selected time, system controller 260 assumes the write is to expansion bus 219. System controller 260 asserts arbitration signal 402 (GXACK) to CPU 210 to indicate slave device 240 is available, and CPU 210 responds by asserting data on address/data signals 410 (NxAD<63:0>). At this point, CPU 210 and CPU bus 220 are effectively decoupled from system controller 260.

System controller 260 proceeds with the write operation by triggering transceivers 270 to convert address signal 426 (LBADR<31:2>) on local bus 218 to address signal 426' (LA<23:17>, SA<19:2>) on expansion bus 219 using bus controller 216. System controller 260 also asserts cycle control signal 442 (SBHE*) to indicate valid data is available on expansion bus 219. Bus device 240 responds with cycle control signal 442 (MEMCS16*) to indicate its data width is 16 bits. System controller 260 then triggers transceivers 270 to convert data signal 428 (LBDATA<31:0>on local bus 218 to data signal 428' (SD<15:0>) on expansion bus 219. Cycle control signals 442 (BALE, MEMW *) are asserted by system controller 260 to validate data on expansion bus 219. Device 240 asserts cycle control signal 442 (IOCHRDY) to system controller 260 to indicate that the write cycle is finished.

Figure 8A:
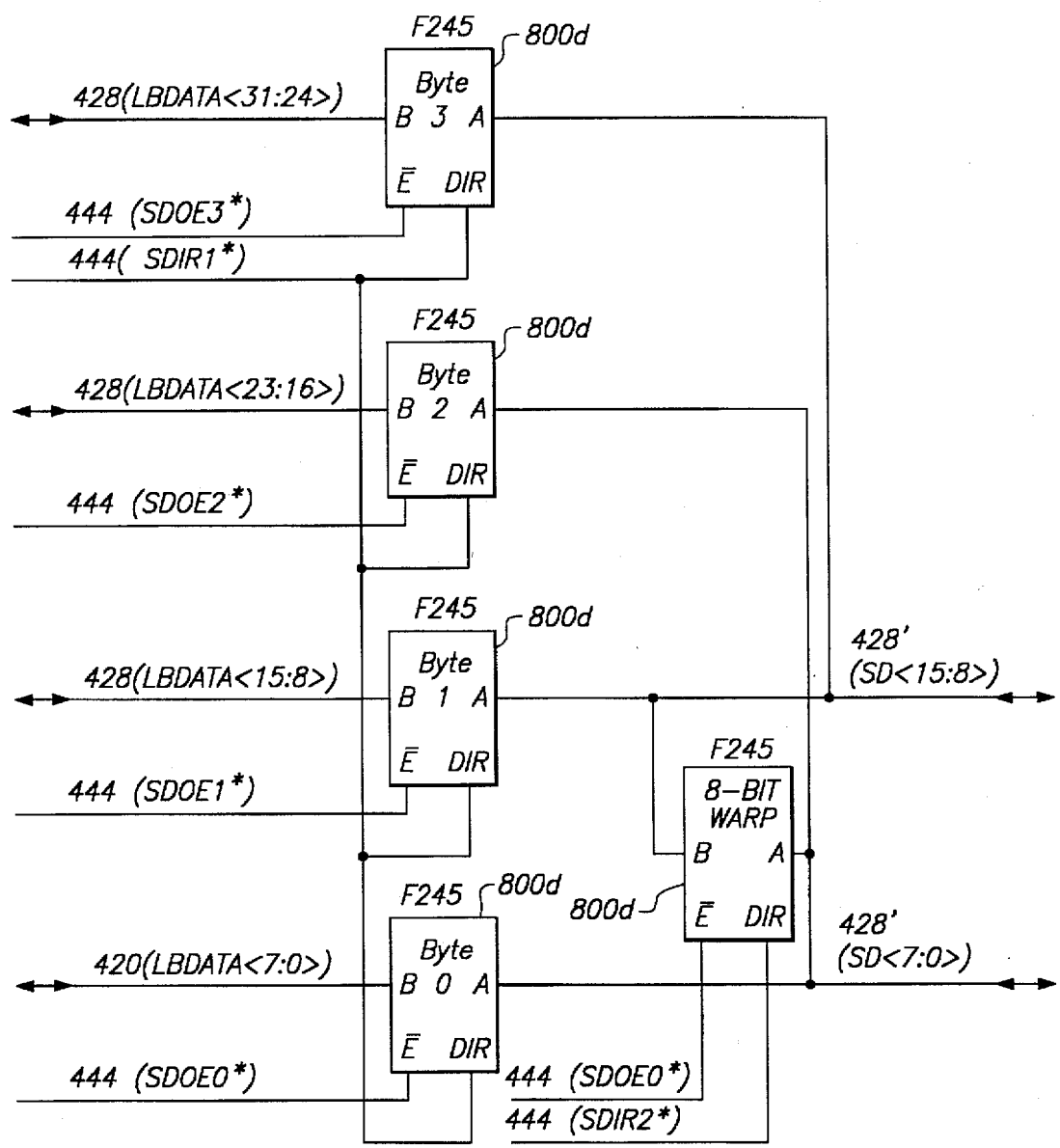
FIGS. 8A, 8B are diagrams of transceivers for coupling the local and expansion buses.
Figure 8B:
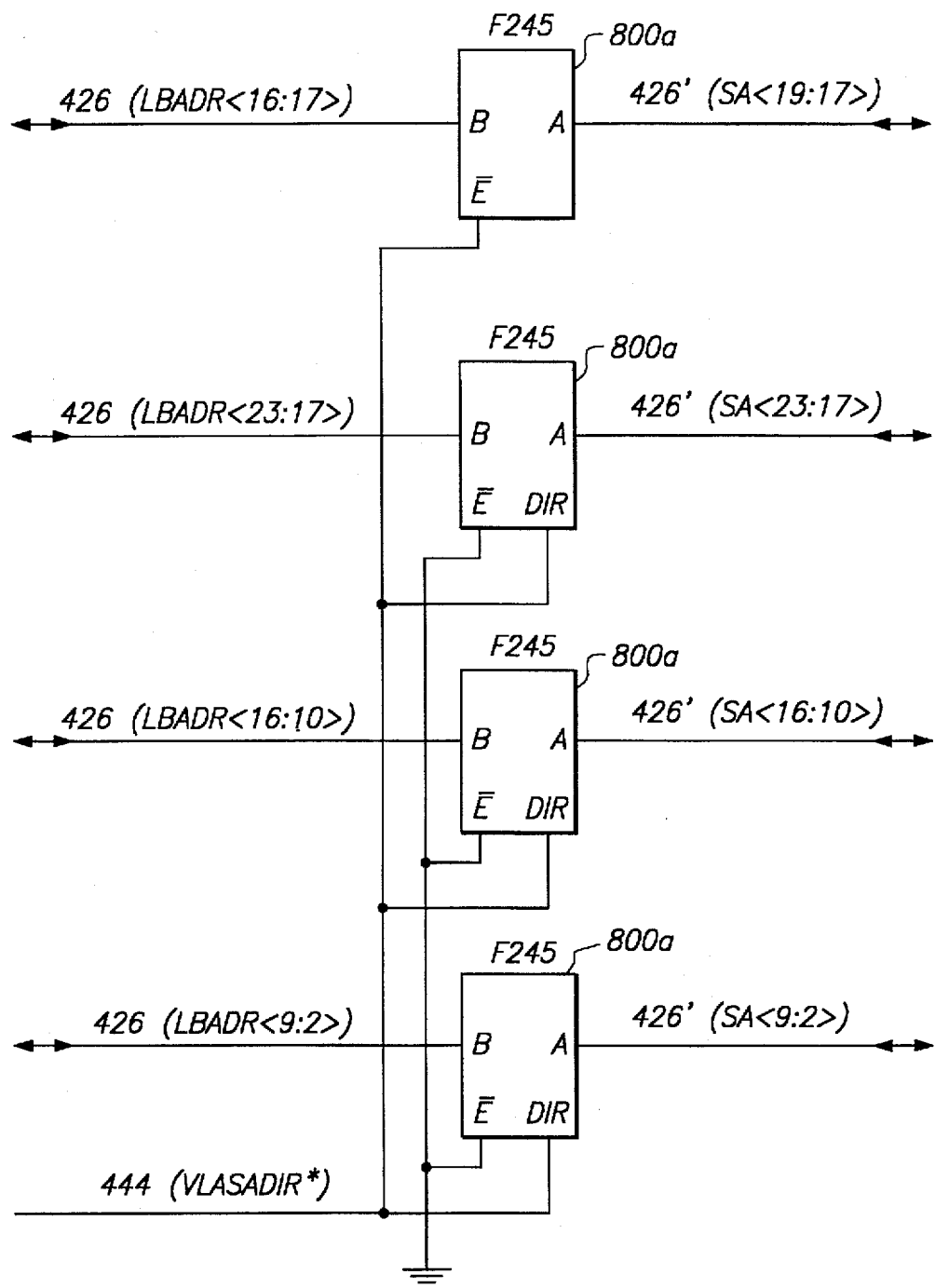

Referring now to FIG. 8A, there is shown a schematic diagram of transceivers 270 for coupling local and expansion buses 218, 219 in the preferred embodiment of computer system 200. Transceiver 270 includes data transceivers 800d to translate between data signals 428 (LBDATA<31:0>) of local bus 218 and data signals 428' (SD<15:0>) of expansion bus 219 in response to transceiver control signals 444 (SDOE0*, SDOE 1*:, SDOE2*, SDOE3*, SDIR 1 *, SDOE01*, SDIR2*). FIG. 8B shows a schematic diagram of address transceivers 800a for translating between address signals 426 (LBADR<23:2>) of local bus 218 and address signals 426' (SA<19:2>, LA<23: 17>) of expansion bus 219 in response to transceiver control signal 444 (VLASADIR*).

The second major function of system controller 260 is to allow emulate a m 214 to emulate a multi-ported memory. This minimizes read and write latencies and facilitates operation of CPU bus 220 and local and expansion buses 218, 219. Referring again to FIG. 3, system controller 260 includes write buffer 330 between bus interfaces 310, 312 and memory controller 350, for buffering all write operations to main memory 214 by bus masters on buses 220, 218, 219. Bus interface 310 is coupled to memory controller 350 through read buffer 332, which buffers read operations between CPU 210 and main memory 214. Similarly, bus interface 312 is coupled to memory controller 350 through read buffers 334, 336, which buffer read operations between main memory 214 and bus masters on local and expansion buses 218, 219, respectively.

Write buffer 330 operates as a first in first out (FIFO) write queue to which data from a bus master may transferred pending a write operation data to main memory 214. In a preferred embodiment of the present invention, write buffer 330 is a 64 byte FIFO queue organized as eight qword (8-byte words) data blocks 331. Each data block 331 has an associated address tag 332, status tag (qword-enable bits) 344, and decoded row-select bits 346 to facilitate snooping and transfers to main memory 214 as discussed in detail below.

Figure 4F:
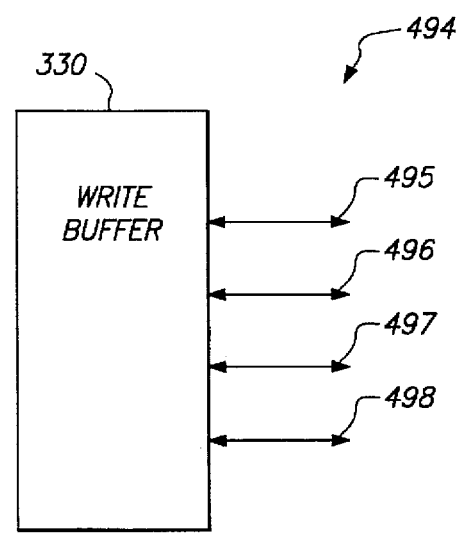

Referring now to FIG. 4F, there are shown FIFO signal lines 494 supported by write buffer 330. FIFOEMPTY 495 is coupled to memory controller 350 to indicate when write buffer 330 is empty and no more data is to be written to main memory 214. FIFO4MTY 496 and FIFO2MTY 497 are coupled to processor bus 210 and local bus 218, respectively, to indicate that write buffer 330 can accept at least 4 and 2q words writes. FIFOFULL 498 (FIFOFULL) is coupled to processor, local and expansion buses 220, 218, 219, respectively, to indicate when write buffer 230 is full. In this case, data writes are blocked at bus interface 310 or 312 until write buffer 330 is emptied.

In the preferred embodiment, write buffer 330 accepts single qword writes and four-qword (burst) writes from CPU 210. System controller 260 supports data writes to write buffer 330 at a rate of one clock cycle per qword, in contrast to data writes from write buffer 330 to main memory 14 which occur at a rate of two or three clock cycles per qword. Write buffer 330 accepts single dword writes and 16 byte block (burst) writes from bus masters on local bus 218 and single byte writes or word writes from bus masters on expansion bus 219.

Read buffers 332, 334, 336 implement a replacement policy (prefetch) that allows them to function as small caches for bus masters on CPU bus 210, local bus 218, and expansion bus 219, respectively. In order to maintain the coherence of cached data, read buffers 332, 334, 336 also snoop all write operations, as discussed in the following section.

In the preferred embodiment, read buffer 332 stores two 32 byte prefetch blocks 335 of data. Read operations initiated by CPU 210 reach read buffer 332 following a cache miss in cache memory 212, in which case a read hit in read buffer 332 obviates the need to search main memory 214. When the second 32 byte block is read by CPU 210, system controller 260 triggers read buffer 332 to read two new 32 byte blocks of data from main memory 214. A read miss in read buffer 332 triggers read buffer 332 to fetch two new 32 byte blocks 335 of data from main memory 214. The first of 32-byte blocks 335 is used to satisfy the read operation and the second of 32-byte blocks 335 serves as a prefetch for subsequent read requests from CPU 210. As with write buffer 330, each data qword in read buffer 332 has an associated address tag 342, qword-valid bits 344, and decoded row-select bits 346 to facilitate snooping by snoop controller 360.

In the preferred embodiment, read buffer 334 stores two 16-byte data blocks 337 and prefetches two new 16 byte data blocks 337 in response to a read miss in read buffer 334 by a bus master on local bus 218. The first of 16 byte data blocks 337 is used to satisfy the read request and the second of 16-byte data blocks 337 serves as a prefetch. Read buffer 336 stores an eight byte data block 339 which is refilled only when a read miss occurs in read buffer 336. Data blocks 337, 339 in read buffers 334, 336, respectively, also include address tags 342 to facilitate snooping, as discussed below.

Write buffer 330 and read buffer 332 add an additional level of data storage between cache memory 212 and main memory 214 of computer system 200. Similarly, read buffers 334, 336 in conjunction with write buffer 330 provide additional levels of data storage between main memory 214 and bus masters on local buses 218, 219, respectively. Consequently, a third function of system controller 260 is maintaining data coherence in the hierarchy of storage locations comprising cache memory 212, write buffer 330, and read buffers 332, 334, 336. These operations are discussed in conjunction with continued reference to FIG. 3.

' The various snooping operations are carried out by system controller 260 in conjunction with snoop controller 360, memory controller 350, memory arbitration unit 370, read buffers 332, 334, 336 and write buffer 330 by comparing addresses asserted on buses 218, 219, 220 with address tags 342 of cached or buffered data. As discussed above, address and status tags 342, 344 are maintained for each qword of data blocks 331 in write buffer 330 and for each qword of data blocks. 335, 337, 339 in read buffers 332, 334, 336, respectively, to monitor data in these queues. In addition, data blocks 281 in cache memory 212 are monitored and invalidated when necessary. In a preferred embodiment of computer system 200, cache memory 212 is organized in 32 byte cache blocks 281 that also include address tags 282 and status tags 284 characterized according to Modified, Exclusive, Shared, Invalid (MESI) protocol. This protocol is well known and is not discussed in further detail here.

Memory arbitration unit 370 of system controller 260 implements a memory arbitration protocol in which reads are executed before writes so that if a read request is received while a write is pending, the read will be executed first. In order to insure that reads are not executed at an address in main memory 214 for which a write is pending, address tags 342 in write buffer 330 are snooped when a bus master on any of buses 220, 218, 219 initiates a read operation. If an address 215 to be read matches address tag 342 of a pending write (a snoop hit), memory controller 350 executes the pending write before the read.

Figure 9:
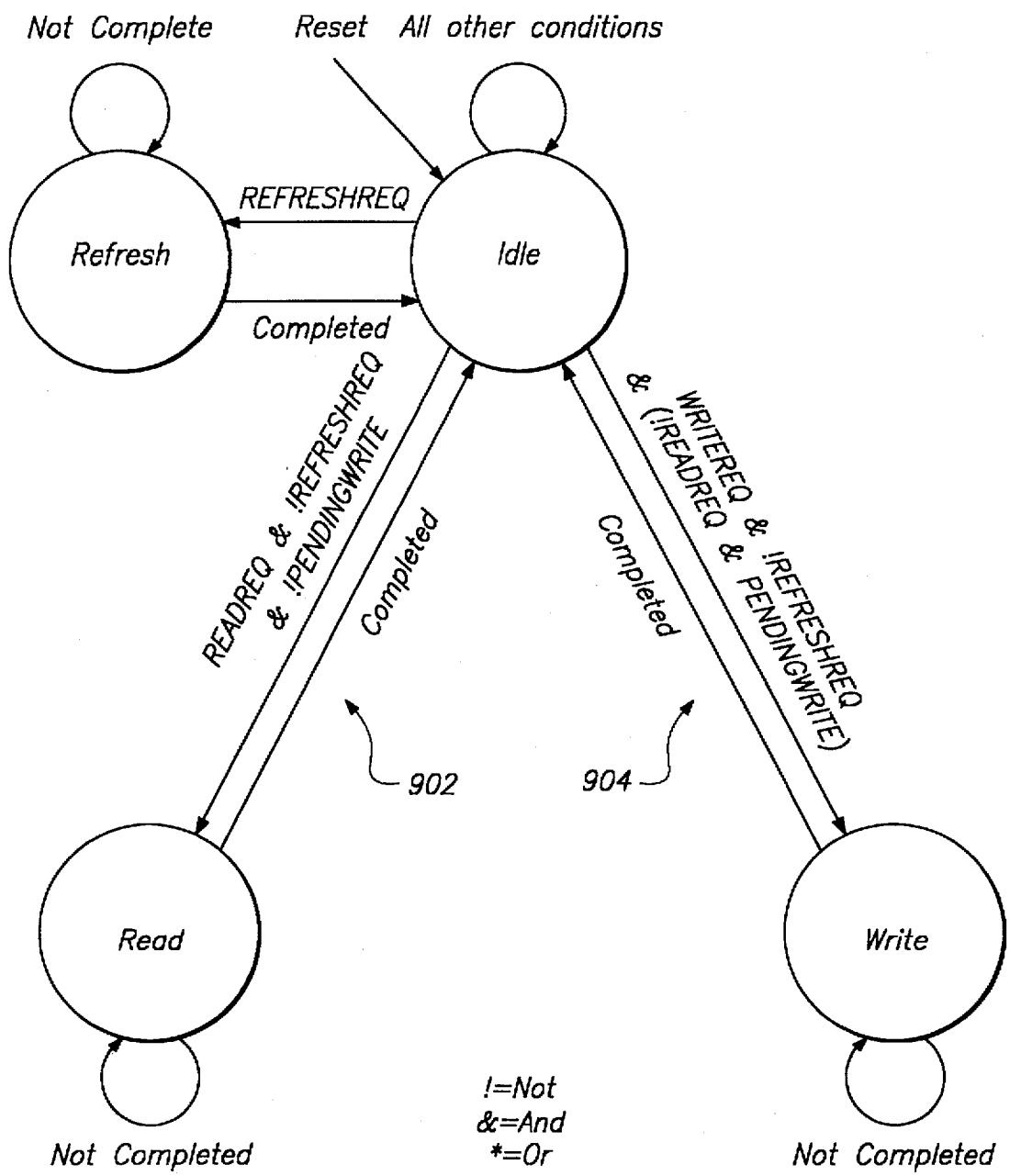
FIG. 9 is a diagram of a state machine implemented by the memory arbitration unit of a system controller in accordance with the present invention.

Referring to FIG. 9, there is shown a state machine 900 for implementing the memory arbitration protocol discussed above. In particular, state machine 900 executes read operations (READREQ) before write operations (WRITEREQ) in step 902 as long as there is no pending write operation (PENDINGWRITE) to the address in main memory 214 to which the read operation is directed, and as long as there is no pending memory refresh request (REFRESHREQ) from a device on expansion bus 219. However, where memory arbitration unit 370 detects a pending write to the same address in main memory 214 to which a read operation is directed, state machine 900 executes the write operation before the read operation at step 904.

Referring again to FIG. 3, read buffers 332, 334, 336 snoop all writes to main memory 214 to insure that invalid data provided to a bus master on buses 220, 218, 219, respectively, is identified as such. When an address tag 324 in one of read buffers 332, 334, 336 matches the address asserted in the write operation (a snoop hit), corresponding status tag 334 is modified to indicate that the data is invalid.

System controller 260 also supports snooping by CPU 210 to insure the coherence of data in cache memory 212 and main memory 214. For this purpose, system controller 260 asserts on CPU bus 220 the addresses of reads and writes to main memory 214 by bus masters on local bus 218 and expansion bus 219. CPU 210 compares the asserted address with address tags 282 in cache block 281, and when a snoop hit occurs, corresponding status tag 284 is updated to indicate that the data in cache block 281 is no longer valid.

It is not necessary to initiate snoop cycles to processor 210 for all such read/write operations to main memory 214. For example, the size of data transfers on Focal bus 218 and expansion bus 219 range from 1 to 16 bytes, which is significantly smaller than the 32 byte data blocks 281 in cache memory 212. Accordingly, repeated transfers by bus masters on local bus 218 and expansion bus 219 could result in multiple snoops to the same address tag 282 in cache memory 212. Such redundant snoops consume bus cycles on CPU 220 and unnecessarily tie up CPU 210 and cache memory 212.

In order to eliminate redundant snoops, system controller 260 includes snoop-tag registers 362 in snoop controller 360, for storing address tags 342 corresponding to address tags 382 in cache memory 212 of recently snooped addresses. In the preferred embodiment, address tags 342 corresponding to the four most recently snooped addresses are stored in snoop-tag registers 362. When an address in main memory 214 is asserted by a bus master on local bus 218 or expansion bus 219, it is compared with address tags 342 in snoop-tag registers 362, and if a match occurs, the snoop cycle to CPU 210 is aborted. When no match occurs, the snoop cycle proceeds, and snoop-tag registers 262 are updated to include address tag 342 of the snooped address.

The write policy of computer system 200 governs the timing of data transfers between cache memory 212 and main memory 214. In the preferred embodiment, computer system 200 implements a write-back policy for cache blocks 281 whereby a data block 381 modified by CPU 210 is retained in cache memory 212 and corresponding status flag 384 is set to indicate that data block 381 has been "modified". Cache data blocks 381 are written back to main memory 214 when, for example, cache memory 212 is flushed in response to a change in context of the code being run by CPU 210, when a cache block 381 containing "modified" data is replaced following a cache miss, or when a snoop cycle hits in a cache block 381 containing "modified" data. In the last case, CPU 210 asserts cache control signal 408 (DCL*) to system controller 260. System controller 260 aborts the bus cycle on local bus 218 or expansion bus 219 and grants control of CPU bus 220 to CPU 210 to write back cache block 381 containing the modified data. A signal line 372 couples bus interface 310 to read buffers 334, 336 for transfering the modified data from cache memory 212 directly to read buffers 334, 336 to satisfy the read request.

Therefore, a computer system 200 has been presented that includes system controller 260 for decoupling CPU bus 220 from local and expansion buses 218, 219 to facilitate concurrent CPU 210 -cache memory 212 and local bus master-main memory 214 operations without introducing additional bus traffic. System controller 260 includes read buffers 232, 234, 236 for main memory 214, which act effectively as additional caches for CPU 210 and bus masters on local and expansion buses 218, 219. Read buffers 332, 334, 336 and write buffer 330 also allow main memory 214 to emulate a multi-ported main memory. System controller 260 supports snoop operations for read buffers 332, 334, 336 and write buffer 330, including a read/write reordering operation to prevent reads of stale data from main memory 214. In addition, snoop-tag registers 362 in system controller 260 prevents redundant snooping, reducing traffic on the CPU bus 20.

Although the present invention has been described with respect to the specific embodiments disclosed, various changes and modifications may be suggested to persons skilled in the art, and it is intended that the present invention covers such changes and modifications as fall within the scope of the appended claims.

TABLE 1

Arbitration Signals 402

| | |
|---|---|
| NREQ* | NexBus Request - Asserted by the Nx586 processor to secure control of the NesBus. The signal remains until GNT* is received from the NxPC chip, although during speculative reads the processor will deactivate NREQ* before GNT* is received if the transfer is no longer needed. NREQ* is treatred the same as AREQ*; when the NxPC chip asserts GNT*, the processor is granted access to all buses in the system-NexBus, VL bus, and ISA bus. |
| LOCK* | Bus Lock - Asserted by the Nx586 processor to sustain a bus grant that was obtained by the assertion of NREQ* or AREQ*. The signal is used by the NxPC chip to determine the end of a bus sequence. Cache-block fills are not locked; they are implicitly treated as atomic reads. |
| AREQ* | Alternate-Bus Request - Asserted by the Nx586 processor to secure locked control of the NexBus and all alternate buses (VL bus or ISA bus). The signal remains active until GNT* is received from the NxPC chip. Unlike NREQ*, the processor does not make speculative requests for the VL bus or ISA bus with AREQ*. The NxPC chip does not issue GNT* until the VL bus or ISA bus are available. AREQ* and NREQ* have the same effect in the sense that either one causes the NxPC chip to grant all buses to the winning requester at the end of the current bus cycle. However, AREQ* locks the use of the buses until it is negated. |
| GNT* | Grant NexBus - Asserted to the Nx586 processor to grant the processor access to all buses. The buses are given to the processor (a) at reset, (b) after a transfer when NREQ* or AREQ* are asserted, (c) when no other master is requesting the buses, or (d) when the processor asserts DCL* as an intervenor during a NexBus snoop cycle initiated by a VL bus master of ISA-bus master access. |

Cycle Control Signals 404

| | |
|---|---|
| ALE* | Address Latch Enable - Asserted by the Nx586 processor to indicate the presence of a valid address on the NxAd<63:0> bus. It is used by the NxPC chip to latch the NexBus address and to signal to the internal state machines that a NexBus cycle has started. |
| GALE | Group Address Latch Enable - Asserted to the Nx586 processor to indicate that valid address and status information can be latched from the NxAD>63:0> bus. It indicates that (a) and ALE* input was received from the processor, or (b) the NxPC chip is initiating a NexBus snoop cycle.. |
| GTAL | Reserved - The signal must be connected to the same-named signal on the Nx586 processor. |
| XACK* | Transfer Acknowledge - Asserted by the Nx586 processor during a NexBus snoop cycle, when the processor determines that it has data from the snooped address. |
| GXACK | Group Transfer Acknowledge - Asserted to the Nx586 processor to indicate that (a) an XACK* input was received from the processor during a NexBus snoop cycle, or (b) the addressed slave -- whether main memory or a slave on the VL bus or ISA bus -- is prepared to respond as a slave to the processor's current operation. |
| XHLD* | Transfer Hold - Asserted by the Nx586 processor when it is unable to respond as a slave on the next clock after GXACK. The NxPC chip responds by inserting wait states in the cycle. |
| GXHLD | Group Transfer Hold - Asserted to the Nx586 processor to indicate that (a) and XHLD* input was received from the processor during a NexBus snoop cycle, and (b) wait states are needed in the current NexBus cycle. At the end of snoop cycles or wait sequences, GXACK is negated one clock after GXHLD is negated. During a bus-crossing read by the processor, the simultaneous assertion of GXACK and negation of GXHLD indicates that valid data is available on the bus. During a bus-crossing write, the same signal states indicate that data has been accepted by the slave. |

Cache Control Signals 406

| | |
|---|---|
| DCL* | Dirty Cache Line - Asserted by the Nx586 processor during snoop cycles on the NexBus. It indicates that the location being accessed is cached by the processor's level-2 cache in a modified (dirty) state. In response, the NxPC chip causes the requesting master's cycle to be aborted so that the processor, as an intervenor, can preemptively gain control of the NexBus and write back its modified data to main memory. The Nx586 processsor's level-2 cache can be software-configured for write-through rather than write-back operation (see the Nx586/Nx587 Databook). When this is done DCL* is never asserted. |
| GBLKNBL | Group Block (Burst) Enable - Asserted to the Nx586 processor during termination of an access to enable burst transfers, and to indicate that the addressed space may be cached. GBLKNBL is negated if the accessed location is among thos stored in the Non-Cacheable Registers (NCR1-NCR0) or if the cycle crosses over to the VL bus or ISA bus. That is, only main memory is cacheable, and only those parts that are not recorded in the Non-Cacheable Registers. |

Transceiver Control Signals 408

| | |
|---|---|
| XBCKE* | NexBus-Transceiver Clock Enable - Asserted by the Nx586 processor to enable the optional 29FCT52B NexBus transceivers to latch addresses and data on the NxAd<63:0> bus (see FIG. 15). In the NxPC chip, these transceivers are integrated into the NxPC chip when the BUFMODE signal is tied high and XBCKE* is tied to the same-named output on the Nx586 processor. XBCKE* indicates to the NxPC chip that the address or data should be latched on the rising edge of the clock. |
| XBOE* | NexBus-Transceiver Output Enable - Asserted by the Nx586 processor to enable the optional 29FCT52B NexBus transceivers to drive addresses and data onto the NxAD<63:0> bus from the AD<63:0> bus (see FIG. 15). In the NxPC chip, these transceivers are integrated into the NxPC chip when the BUFMODE signal is tied high and XBOE* is tied to the same-named output on the Nx586 processor. |

TABLE 1-continued

Address/Data Signals 410

NxAD<63:0>    NexBus Address and Status, or Data - As an input, the signal is driven by the Nx586 processor during the address phases of all processor-initiated cycles and during the data phases of processor write cycles. As an output, the bus is driven to the Nx586 processor during the address phases of NxPC snoop cycles and the data phases of processor read cycles.
When the NxPC chip is configured to emulate NexBus transceivers (BUFMODE tied high), this bus is tied directly to the NxAD<63:0> bus on the Nx586 processor, as shown in FIG. 15. For a detailed description of signaling on pins NxAD<63:32> during the address and status phase, see the signal descriptions in the Nx586 Microprocessor and Nx587 Numerics Processor Databook. NxAD<63:0> is a tristate bus.

TABLE 2

Arbitration Signals 422

LREQ<2:0>*    VL-Bus Request - Asserted by VL-bus masters to gain access to the buses. There can be up to three VL-bus masters. The NxPC chip gives circular priority to the three masters in the order 3,1,2. See the section entitled Bus Arbitration in the Bus Operations chapter.

LGNT <2:0>*   VL-Bus Grant - One of these three outputs may be asserted to a VL-bus master in response to that master's assertion of its LREQ<n>* signal. The NxPC chip thereby grants mastership of all three buses to a requesting master according to the NxPC chip's arbitration protocol. See Bus Arbitration in the Bus Operations chapter.

LKDEV <2:0>*  VL-Bus Device - Asserted by VL-bus devices to indicate when an address on the VL bus is addressing that device. The timing relationships for this signal differ with different clock speeds, see FIG. 40.

Cycle Control Signals 424

LADS*         VL-Bus Address Strobe - As an input, the signal is asserted by the VL-bus master to indicate the presence of a valid address on the VL bus. As an output, the signal is asserted to the VL bus during bus-crossing cycles initiated by the Nx586 processor, 82C206 DMA, on ISA-bus master. It indicates the presence of a valid address on the VL bus.

LBD/C*        VL-Bus Data or Code - As an input, the signal is driven by the VL-bus master to indicate a data (negated) or instruction (asserted) access. As an output the signal is driven to the VL-bus slaves. It indicates a data or instruction access during bus-crossing cycles initiated by the Nx586 processor, 82C206 DMA, or ISA-bus master. In both directions, the signal is interpreted in conjunction with LADS*, LBADR<312:2>, LBM/IO*, LBW/R*, and LBE<3:0>*.

LBM/IO*       VL-Bus Memory or I/O - As an input, the signal is driven by the VL-bus master to indicate a memory (negated) or I/O (asserted) access. As an output, the signal is driven to the VL-bus slaves. It indicates a memory or I/O access during bus-crossing cycles initiated by the Nx586 processor, 82C206 DMA, or ISA-bus master. In both directions, the signal is interpreted in conjunction with LADS*, LBADR<31:2>, LBD/C*, LBW/R*, and LBE <3:0>*.

LBW/R*        VL-Bus Write or Read - As an input, the signal is driven by the VL-bus master to indicate a write (negated) or read (asserted) access. As an output, the signal is driven to the VL-bus slaves. It indicates a write or read access during bus-crossing cycles initiated by the Nx586 processor, 82C206 DMA, or ISA-bus master. In both directions, the signal is interpreted in conjunction with LADS*, LBADR<31:2>, LBD/C*, LBM/IO*, and LBE<3:0>*.

LBS16*        VL-Bus Size 16 - Asserted by VL-bus slave to indicate that the slave is a 16-bit device. If more than 16 bits are to be transferred, the NxPC chip breaks the transfer as needed.

LBE<3:0>*     VL-Bus Byte Enables - As an input, the signal is driven by the VL-bus master to indicate valid bytes in the currently addressed qword. The numbering of the LBE<n>* signals corresponds to the byte location within the dword: if LBE<0> is asserted, the least-significant byte of the qword is valid. As an output, the signal is driven to the VL-bus slaves. It indicates valid bytes in the currently addressed qword during bus-crossing cycles initiated by the Nx586 processor, 82C206 DMA, or ISA-bus master. In both directions, the signal is interpreted in conjunction with LADS*, LBADR<31:2>, LBD/C*, LBM/IO*, and LBW/R*.

LRDY*         VL-Bus Ready - As an input, the signal is asserted by a VL-bus slave to indicate the end of a bus-crossing transfer initiated by the Nx586 processor, the 82C206 DMA, or an ISA-bus master. As an output, the signal is asserted to the VL bus to indicate that the requested data is valid on the VL bus. It indicates the end of the current transfer. Compare BRDY*.

RDYRTN*       VL-Bus Ready Return - Asserted to al VL-bus devices in response to an LRDY* input when a VL-bus slave finishes a cycle. The signal can be asserted in response to VL-bus master cycle to a VL-bus slave, or to a bus-crossing cycle with a VL-bus slave that is initiated by the Nx586 processor, the 82C206 DMA controller, or an ISA-bus master.

BLAST*        VL-Bus Burst Last - As an input, the signal is asserted by a VL-bus master to indicate the last data transfer of either a burst or a non-burst VL-bus cycle. The cycle ends with the next assertion of BRDY* or LRDY*. The signal is negated by the VL-bus master throughout non-burst transfers. As an output, the signal is asserted to the VL bus throughout bus-crossing cycles. It indicates a non-burst cycle - i.e., that the next time LRDY* is asserted, the cycle will be complete. The Nx586 processor cannot do bursts to the VL bus, but a VL-bus master can do bursts to main memory.

BRDY*         VL-Bus Burst Ready - Asserted to a VL-bus master during burst memory cycles. It

TABLE 2-continued indicates that data for one of four (4) data transfers is currently valid on the VL bus. Whenever the VL-bus master addresses main memory, the NxPC chip attempts to perform burst transfers and terminates each transfer with BRDY*. If the VL-bus master addresses memory on the ISA bus, the NxPC chip will not support burst transfers and will respond instead with LRDY*. Compare LRDY*. BRDY* is a tristate signal.

Local (VL) Bus Address Signals 426

| | |
|---|---|
| LBADR<31:2> | VL-Bus Address - As an input, the signal is driven by the VL-bus master with the address being accessed. |
| (LA<23:17>, SA<19:2> 426') | As an output, the signal is driven with an address to the VL-bus slaves during bus-crossing cycles initiated by the Nx586 processor, 82C206 DMA, or ISA-bus master. In both directions, the signal is interpreted in conjuction with LBD/C*, LBM/IO*, LBW/R*, and LBE<3:0>*. |

Local (VL) Bus Data Signals 428

| | |
|---|---|
| LBDATA<31:0> (SD<15:0> 428') | VL-Bus Data - As an input, the signal is driven by the VL-bus master during read cycles. As an output, the signal is driven to the VL-bus master during memory write cycles. |

TABLE 3

Cycle Control Signals 442

| | |
|---|---|
| MASTER* | ISA-Bus Master - Asserted by an ISA-bus master to indicate that it is in control of the ISA bus. This also causes the 82C206 peripheral controller to not participate as a DMA controller in the transfers. |
| AEN | ISA-Bus Address Enable - Asserted to ISA-bus slaves, only during DMA bus-master cycles on the ISA bus, to disable address decoding by I/O devices on the ISA bus. The signal is negated during all other types of cycles to enable address decoding by I/O devices on the ISA bus. |
| SBHE* | ISA-Bus High Byte Enable - As an input, the signal is asserted by an ISA-bus master during ISA-bus cycles to indicate that the master is either requesting or providing valid data on the high byte of the ISA byte of the ISA bus, SD<15:8>. As an output, the signal is asserted to the ISA bus during bus-crossing cycles inititated by the Nx586 processor or a VL-bus master, or during 82C206 DMA cycles. Again, it indicates that the master is either requesting or providing valid data on the high byte of the ISA bus, SD>15:8>. |
| BALE | ISA-Bus Address Latch Enable - Asserted to ISA-bus devices to indicate that the ISA-bus address, AEN, and SBHE* signals are all valid. For ISA-bus master cycles, this signal is asserted throughout that master's cycle. |
| MEMR* | ISA-Bus Memory Read - As an input, the signal is asserted by the 82C206 DMA controller or an ISA-bus master during DMA reads. As an output, the signal is asserted to an ISA-bus memory slave during bus-crossing reads by the Nx586 processor or by a VL-bus master. The NxPC chip also asserts MEMR* when an ISA-bus master asserts REFRESH*. |
| MEMW* | ISA-Bus Memory Write - As an input, the signal is asserted by the 82C206 DMA controller or an ISA-bus master during DMA writes. As an output, the signal is asserted to an ISA-bus memory slave during bus-crossing writes by the Nx586 processor or by a VL-bus master. |
| MEMCS16* | ISA-Bus Memory Chip Select 16 - As an input, the signal is driven by an ISA-bus memory slave during bus-crossing cycles by the Nx586 processor or by a VL-bus master. The NxPC chip responds by performing 16-bit memory cycles. The signal is similar to IOCS16*, except that it is bi-directional and driven during memory instead of I/O cycles. The signal is open drain. As an output, the signal is driven to an ISA-bus memory slave during cycles in the 512kB-to-1MB range of memory by the 82C206 DMA controller or an ISA-bus master. Output is enabled when bit 18 of the Configuration Register is set to 1. |
| SMEMR* | ISA-Bus System Memory Read - Asserted to an ISA memory slave during read cycles in which the ISA-bus address is less than 1MB. The output is derived by the MEMR* signal. SMEMR* is tristate signal. |
| SMEMW* | ISA-Bus System Memory Write - Asserted to an ISA memory slave during write cycles in which the ISA-bus address is less than 1MB. The output is derived by the MEMR* signal. SMEMW* is a tristate signal. |
| IOR* | ISA-Bus I/O Read - As an input, the signal is asserted by the ISA-bus master during I/O read cycles on the ISA-bus. As an output, the signal is asserted to an ISA-bus slave during I/O read cycles by the Nx586 processor or a VL-bus master. |
| IOW* | ISA-Bus I/O Write - As an input, the signal is asserted by the ISA-bus master during I/O write cycles on the ISA-bus. As an output, the signal is asserted to an ISA-bus slave during I/O write cycles by the Nx586 processor or a VL-bus master. |
| IOCS16* | ISA-Bus I/O Chip Select 16 - Asserted by an ISA-bus I/O slave to signal that the slave can support 16-bit (or shorter) access cycles. |
| IOCHRDY | ISA-Bus I/O Channel Ready - As an input, the signal is asserted by an ISA device to indicate the end of a bus-crossing cycle initiated by the Nx586 processor or a VL-bus master. If the signal is negated, the NxPC chip will add wait states. The signal is open drain. As an output, the signal is asserted to the 82C206 peripheral controller during 82C206 DMA or ISA-master cycles to indicate that the cycle is finished. If the signal is negated, the 82C206 will add wait states. |
| IOCHCK* | ISA-Bus I/O Channel Check Error - Asserted by an ISA-bus device to indicate an error condition on the ISA bus. It is used to generate NMI* to the Nx586 processor. The state of the signal can also be read from bit 6 of I/O port 61h on the NxPC chip; |

TABLE 3-continued

Transceiver Control Signals 444

| | |
|---|---|
| VLASADIR* | VL-to-ISA Address Direction - Asserted to external F245 transceivers to enable a VL-bus address onto the ISA bus. The signal is negated to enable an ISA-bus address onto the VL bus. See FIG. 21. |
| SDIR1* | SD-Buffer Direction - Asserted to external F245 transceivers to select the direction of data |
| SDIR2 | transfer between the ISA bus (SD bus) and the VL bus. See FIG. 20. |
| SDOE0* | SD-Buffer Output Enable - Asserted to external F245 transceivers to enable transfers |
| SDOE1* | between the ISA bus (SD bus) and the VL bus. See FIG. 20. |
| SDOE2* | |
| SDOE3* | |
| SDOE01* | SD-Buffer Output Enable - Asserted to external F245 transceivers to enable transfers between the ISA bus (SD bus) and the VL bus. See FIG. 20. |
| XDEN* | XD-Buffer Enable - Asserted to external F245 transceivers to enable data flow between the SD and XD buses. The signal is asserted during all I/O transactions and at the beginning of DMA transfers. See FIG. 22. |
| XDIR* | XD-Buffer Direction - Asserted to external F245 transceivers to direct data from the SD bus to XD bus. Negated to direct data from the XD bus to the SD bus. See FIGS. 20 and 22. |

Address, Refresh, Clock Signals 446, 448, 450

| | |
|---|---|
| SA<1:0> | ISA-Bus Address Bits 1 and 0 - As an input, the signals are asserted by an ISA-bus master or the 82C206 peripheral controller during ISA-bus cycles. The signals are the lower two bits of address on the SA bus; the rest of the address is translated from the VL bus. As an output, the signals are asserted to an ISA-bus slave during bus-crossing cycles initiated by the Nx586 processor or VL-bus master. They provide the lower two bits of address, which are derived from the VL-bus byte-enables bits, LBE<3.0>*. |
| REFRESH* | ISA-Bus Refresh - As an input, the signal is asserted by the ISA-bus master when the master wants a refresh cycle for ISA-bus memory. As an output, the signal is asserted to memory on the ISA bus when the ISA refresh logic in the NxPC chip decides to perform an ISA-bus memory refresh cycle. The signal is open drain. For the NxPC chip to perform ISA refresh cycle, bit 26 of the Configuration Register must be set to 1, or the TURBO input must be negated. |
| ISABCLK | ISA-Bus Clock - This clock runs at a programmable division of the NexBus clock, CLK, as specified in bits 11:10 of Configuration Register. CLK can be divided by 3,4,5, or 6 to derive ISABCLK. The clock is not used for any logic inside the NxPC chip. It is simply an output specified for the ISA bus, although it is not commonly used by ISA-bus devices. |

TABLE 4

Cycle Control Signals 462

| | |
|---|---|
| DRAMBFDIR | DRAM Buffer Direction - Driven high during write cycles to main memory. Driven low during read cycles. |
| WE* | Write Enable - Asserted to select main memory during a write cycle. If WE* is negated and CASA<7:0>* or CASB<7:0>* is asserted, a read cycle is assumed. |

Address Signals 464

| | |
|---|---|
| MA<11:0> | Memory Address - Driven to main memory with row and column addresses during memory accesses and refresh cycles. |

Row/Column Address Strobe Signals 466

| | |
|---|---|
| RAS<7:0>* | Row Address Strobes - Asserted to the main memory DRAM modules during memory accesses and refresh cycles. |
| CASA<7:0>* | Column Address Strobes (Bank A) - Asserted to bank A(1) of the main memory modules during memory read and write cycles. |
| CASB<7:0>* | Column Address Strokes (Bank B) - Asserted to bank B(2) of the main memory modules during memory read and write cycles. |

Data Signal 468

| | |
|---|---|
| MD<63:0> | Memory Data - As an input, the signal is driven by main memory during read cycles. As an output, the signal is driven to main memory during memory write cycles. |

Parity Signals 470

| | |
|---|---|
| MPAR<7:0> | Memory Parity - As an input, the signals are driven by main memory during read cycles to indicate even parity on the MD<63:0> bus. MPAR<0>* corresponds to the byte on MD<7:0>, and MPAR<7>* corresponds to the byte on MD<63:56>. As an output, the signals are driven in a similar manner to main memory during memory write cycles. However, parity errors are only reported via NMI* if main-memory parity checking is enabled by setting bit 15 of the Configuration Register (CFG0) to 1. |

TABLE 5

Cycle Control Signal 482

| | |
|---|---|
| ASRTC | Address Strobe for Real-Time Clock - Asserted to the AS or ASRTC signal of the 82C206 peripheral controller. It is used on the falling edge to latch the address from the XD bus. |

Counter Control Signals 484

| | |
|---|---|
| OUT2 | Counter 2 Out - Asserted by the 82C206 peripheral controller to control speaker frequency. The signal is ANDed in the NxPC chip with the value of bit 0 in port 61h. The state of the signal can be read at bit 5 of port 61h. |
| GATE2 | Gate For Counter 2 - Asserted to the 82C206 peripheral controller. It enables counter 2 on the controller. The signal is activated by writing bit 0 of I/O port 61h on the NxPC chip. It is typically used to control the frequency of the speaker. |

DMA Control Signals 486

| | |
|---|---|
| HHOLD | Hold Request - Asserted by the 82C206 peripheral controller to indicate that access to the buses is needed for a DMA cycle between main memory and the ISA bus. Either the 82C206 peripheral controller or an ISA-bus master can be a DMA master and support transfers between main memory and the ISA bus. The VL bus does not support DMA transfers. The NexBus supports DMA transfers, but not in the single-processor configuration implemented with the NxPC chip. |
| HLDA | Hold Acknowledge - Asserted to the 82C206 peripheral controller in response to latter's assertion of HHOLD. It indicates that the 82C206 has been granted the buses. |
| ADSTB16 | Address Strobe for 16-Bit DMA - Asserted by the 82C206 peripheral controller during 16-bit DMA transfers between main memory and the ISA bus. It is used to latch the upper byte of address from the XD<7:0> data bus onto the SA<16:9> address bus. |
| AEN16* | Address Enable for 16-Bit DMA - Asserted by the 82C206 during 16-bit DMA transfers between main memory and the ISA bus. It is used to enable output of the upper byte of DMA address (A9–A16). |
| ADSTB8 | Address Strobe for 8-bit DMA - Asserted by the 82C206 during 8-bit DMA transfers between main memory and the ISA bus. It is used to latch the upper byte of address from the XD<7:0> data bus onto the SA<15:8> address bus. |
| AEN8 | Address Enable for 8-Bit DMA - Asserted by the 82C206 during 8-bit DMA transfers between main memory and the ISA bus. It is used to output of the upper byte of DMA address (A8–A15) onto the ISA bus. |

Interrupt Signal 488

| | |
|---|---|
| INTA* | Interrupt Acknowledge - Asserted to the 82C206 peripheral controller in response to decoding the Nx586 processor's Interrupt Acknowledge cycle. As with all processor cycles not intended for main memory, the NxPC chip translates the Interrupt Acknowledge cycle onto the VL bus. The 82C206 responds by placing the interrupt vector on the XD bus, from which the NxPC chip translates onto the NexBus. |

TABLE 6

System Signals 490

| | |
|---|---|
| CLK | NexBus Clock - The NexBus clock. Its frequency must be 25, 33, or 40 MHz. It must be the same clock that is used for the VL-bus clock. Bits 9:8 of the Configuration Register, which generate wait states, must be set to the speed of this clock. |
| NMI* | Non-Maskable Interrupt - Asserted to the Nx586 processor three clocks after a main-memory parity error or an ISA-bus I/O channel check error (IOCHCK*). To function in this manner, however, the NMI* signal must be enabled by writing a 1 to bit 7 of port 70h, and for I/O channel checks on the ISA bus, bit 2 of port 61h must cleared to zero (enabled). |
| RESET* | Global Reset - Asserted by system logic. The NxPC chip responds by resetting all internal state machines, loading default values into the Configuration Register, and asserting RESETCPU* to the Nx586 processor. See the Reset and Initialization section in the Configuration and Testing chapter. |
| RESETCPU* | Processor Reset - Asserted to the Nx586 processor in any of four cases: (1) when the NxPC chip receives RESET*, (2) the processor writes a 1 to bit 0 of port 92h, called the fast CPU reset bit, (3) the processor runs a shutdown cycle, or (4) the processor does a keyboard reset cycle. See the Reset and Initialization section in the Configuration and Testing chapter. |
| PARERR* | Reserved - These signals must be left unconnected. |
| GATEA20 | Gate For Address 20 - Asserted to the Nx586 processor when the current value of address bit 20 is needed on the NxAD<63:0> bus, and negated when a 0 is needed on address bit 20. The signal is used to replicate the IBM PC's method of handling 80286 address wraparound for addresses above the 20-bit limit. See GATEA20 in the Configuration and Testing chapter. |
| TURBO | Turbo Switch - Asserted by system logic or a front-panel button to place the NxPC chip in fast mode. When the signal is negated (slow mode) the NxPC chip extends the length of the ISA refresh cycles by a predetermined number of clocks, as specified in bits 7:0 of the Configuration Register (CFG0). |
| BUFMODE | Buffered Mode - Tied high by external logic to select the NexBus-buffer emulation mode. In this mode, the NxPC chip's NexBus interface emulates the function of 29FCT52 bus |

TABLE 6-continued

System Signals 490

|         | transceivers. When negated, external 29FCT52 transceivers must be provided between the NxPC chip and NexBus. Typically, if the Nx586 processor is on that same board as the NxPC chip, transceivers are not needed and BUFMODE should be asserted. See FIG. 34 and FIG. 15. |
|---------|---|
| ROMCS*  | ROM Chip Select - Asserted to select ROM, if FLASHCS* is not enabled. The signal is derived by decoding address 0xE0000h to 0xFFFFFh on the ISA bus, along with MEMR*. |
| FLASHCS* | Flash-ROM Chip Select - Asserted to select Flash ROM, if tha ROM is enabled by bit 27 (write) and/or bit 28 (read) of the Configuration Register. When either of these register bits are set to 1, the Flash ROM will be selected and ROMCS* will not be generated. |
| KBDCS*  | Keyboard Chip Select - Asserted to the 8742 keyboard controller chip when I/O address 60h or 64h is accessed. |
| SPKR    | Speaker Data - Asserted by the NxPC chip to the speaker port. |
| SSSPARE2 SSPARE0 | Reserved - These pins must be left unconnected |

What is claimed is:

1. A virtual, multi-ported memory for facilitating concurrent operations in a computer system having multiple buses, the virtual, multi-ported memory comprising:

a single-ported main memory device;

a memory controller coupled to the main memory device for reading and writing memory locations in the main memory device responsive to signals from buffers;

a write buffer coupled between the memory controller and the multiple buses of the computer system, for buffering write signals between the multiple buses and the memory controller;

a first read buffer coupled between the memory controller and a first bus of the multiple buses for buffering read signals between the first bus and the memory controller and for snooping write signals to the write buffer; and a second read buffer coupled between the memory controller and a second bus of the computer system for buffering read signals between the second bus and the memory controller and for snooping write signals to the write buffer.

2. The virtual, multi-ported memory of claim 1, further comprising a third read buffer coupled between the memory controller and a third bus of the multiple buses for buffer read signals between the third bus and the memory controller.

3. The virtual, multi-ported memory of claim 2, further comprising a memory arbitration unit coupled between the memory controller and the write and mad buffers, for regulating access to the memory controllers by the write and read buffers according to a first priority scheme.

4. The virtual, multi-ported memory of claim 3, further comprising a bus arbitration unit coupled to the multiple buses, read buffers, and write buffer for regulating access to the read buffers and write buffers according to a second priority scheme.

5. The virtual, multi-ported memory of claim 4, further comprising a bus controller coupled to the bus arbitration unit and the third bus for coupling bus control signals to the third bus and wherein data and address lines of the third bus are coupled to data and address lines of the second bus.

6. The virtual, multi-ported memory of claim 5, further comprising:

a first bus interface for coupling the write buffer and the first read buffer to the first bus; and a second bus interface for coupling the write buffer and the second read buffer to the second bus and for coupling the write buffer and the third read buffer to the data and address lines of the third bus.

7. The virtual, multi-ported memory of claim 4, in which the first read buffer implements a data replacement protocol for prefetching data from main memory prior to receiving a read signal requesting the prefetched data.

8. The virtual, multi-ported memory of claim 7, in which the second read buffer implements a data replacement protocol for prefetching data from main memory prior to receiving a read signal requesting the prefetched data.

9. The virtual, multi-ported memory of claim 8, wherein the third read buffer implements a data replacement protocol for prefetching data from main memory prior to receiving a read signal requesting the prefetched data.

10. The virtual, multi-ported memory of claim 9, wherein a default condition of the first priority scheme allows the memory controller to process read signals from the read buffers prior to processing write requests from the write buffer.

11. The virtual, multi-ported memory of claim 9, wherein the first, second, and third read buffers are coupled to snoop write signals to the write buffer and wherein the first priority scheme allows the memory controller to process a write signal from the write buffer prior to processing a read signal from the first, second, and third buffers when the write signal is directed to an address in main memory that is the same as a read signal in one of first, second, or third read buffers.

12. A system controller for use in a computer system that includes a main memory, a central processor unit with a cache memory, a processor bus, and a local bus, the system controller comprising:

a first bus interface for translating bus signals between the processor bus and the system controller;

a second bus interface for translating bus signals between the local bus and the system controller;

a memory controller for providing control signals to the main memory, responsive to the receipt of read and write bus signals;

a write buffer coupled between the first bus interface and the memory controller and between the second bus interface and the memory controller, for buffering write bus signals that are applied to the first and second bus interfaces, respectively, to the memory controller;

a first read buffer coupled between the first bus interface and the memory controller for buffering read signals between the first bus interface and the memory controller, the first bus interface, the write buffer, and the first read buffer forming a first path to the memory controller; and a second read buffer coupled between the second bus interface and the memory controller for buffering read bus signals between the second bus interface and the memory controller; the second bus interface, the write buffer, and the second read buffer forming a second path to the memory controller that is decoupled from the first path to the memory controller formed by the first bus interface, the write buffer, and the first read buffer.

13. The system controller of claim 12, further comprising an inter-buffer interface coupled between the first and second bus interfaces, for translating bus signals between the first and second bus interfaces.

14. The system controller of claim 13, further comprising a bus arbitration controller coupled to the first and second bus interfaces for regulating control of the processor and local buses by bus masters on the processor and local buses in accordance with a priority scheme.

15. The system of claim 14, further comprising:
a third read buffer coupled between the second bus interface and the memory controller;
a bus controller coupled to the bus arbitration controller; and
wherein the computer system also includes an expansion bus that is coupled to the system controller through the local bus and to the bus controller, the expansion bus coupling signals between bus masters on the expansion bus and main memory and bus masters on the processor and local buses responsive to control signals from the bus controller.

16. The system controller of claim 15, further comprising:
a peripheral interface coupled to the bus arbitration controller; and
wherein the computer system also includes a peripheral controller that is coupled to the system controller through the expansion bus and the peripheral interface for providing direct memory access between peripheral devices on the expansion bus and main memory and between peripheral devices on the expansion bus and a memory slave on the local bus, responsive to control signals from the bus controller and the peripheral interface.

17. The system controller of claim 14, further comprising a memory arbitration controller coupled to the memory controller, the write buffer, and the first, second, and third read buffers, for regulating access to the memory controller from the read and write buffers according to a second priority scheme.

18. The system controller of claim 17, wherein a default condition of the second priority scheme allows the memory controller to process read signals from the read buffers prior to processing write requests from the write buffer.

19. The system controller of claim 18, wherein the first, second, and third read buffers are coupled to snoop write signals to the write buffer and wherein the second priority scheme allows the memory controller to process a write signal from the write buffer prior to processing a read signal from the first, second, and third buffers when the write signal is directed to an address in main memory that is the same as a read signal in one of first, second, or third read buffers.

20. The system controller of claim 19, further comprising a snoop control unit for coupling memory addresses asserted by bus masters on the first and expansion buses to the processor bus, for maintaining coherence between the data in the cache memory of the processor and the data in the read and write buffers of the system controller.

21. The system controller of claim 20, further comprising:
a snoop cross-over line coupled between the first bus interface and the first, second, and third buffers, for coupling selected data written to the write buffer by the processor to the read buffers; and
wherein the processor implements a MESI cache coherency protocol to identify selected data in the cache memory for immediate writing back to main memory, the snoop cross over line providing the selected data to a read buffer processing a read signal for the selected data.

22. A multi-bus computer system comprising:
a central processor having a cache memory;
a processor bus coupled to the central processor for coupling us signals to and from the central processor;
a local bus;
a main memory; and
a system controller coupled to the processor and local buses and the main memory for coupling bus signals between the processor and local buses and between main memory device and the processor and local buses, the system controller comprising:
a first bus interface for translating bus signals between the processor bus and the system controller;
a second bus interface for translating bus signals between the local bus and the system controller;
a memory controller for providing control signals to the main memory, responsive to the receipt of read and write bus signals;
a write buffer coupled between the first bus interface and the memory controller and between the second bus interface and the memory controller, for buffering write bus signals that are applied to the first and second bus interfaces, respectively, to the memory controller;
a first read buffer coupled between the first bus interface and the memory controller for buffering read signals between the first bus interface and the memory controller, the first bus interface, the write buffer, and the first read buffer forming a first path to the memory controller; and
a second read buffer coupled between the second bus interface and the memory controller for buffering read bus signals between the second bus interface and the memory controller, the second bus interface, the write buffer, and the second read buffer forming a second path to the memory controller that is decoupled from the first path to the memory controller formed by the first bus interface, the write buffer, and the first read buffer.

23. The multi-bus computer system of claim 22, wherein the system controller further comprises an inter-buffer interface coupled between the first and bus interfaces, for translating bus signals between the first and second bus interfaces.

24. The multi-bus computer system of claim 23, wherein the system controller further comprises a bus arbitration controller coupled to the first and second bus interfaces for regulating control of the processor and local buses by bus masters on the processor and local buses in accordance with a priority scheme.

25. The multi-bus computer system of claim 24, further comprising:
an expansion bus that is coupled to the system controller through the local bus; and
wherein the system controller further comprises a third read buffer coupled between the second bus interface and the memory controller and a bus controller coupled to the bus arbitration controller and the expansion bus, for coupling signals between bus masters on the expansion bus and main memory and bus masters on the processor and local buses responsive to control signals from the bus controller.

26. The multi-bus computer system of claim 24, further comprising:

a peripheral controller that is coupled to the system controller through the expansion bus; and wherein the system controller further comprises a peripheral interface coupled to the bus arbitration controller and the peripheral controller, for providing direct memory access between peripheral devices on the expansion bus and main memory and between peripheral devices on the expansion bus and a memory slave on the local bus, responsive to control signals from the bus controller and the peripheral interface.

27. The multi-bus computer system of claim 24, wherein the system controller further comprises a memory arbitration controller coupled to the memory controller, the write buffer, and the first, second, and third read buffers, for regulating access to the memory controller from the read and write buffers according to a second priority scheme.

* * * * *